United States Patent [19]

Auerbach et al.

[11] Patent Number: 5,634,011

[45] Date of Patent: May 27, 1997

[54] DISTRIBUTED MANAGEMENT COMMUNICATIONS NETWORK

[75] Inventors: Joshua S. Auerbach, Ridgefield, Conn.; John E. Drake, Jr., Pittsboro, N.C.; Prabandham M. Gopal, Wayne, N.J.; Elizabeth A. Hervatic, Apex, N.C.; Marc A. Kaplan, Katonah, N.Y.; Shay Kutten, Rockaway, N.J.; Marcia L. Peters, Pittsboro, N.C.; Michael J. Ward, New Haven, Conn.

[73] Assignee: International Business Machines Corporation, Armonk, N.Y.

[21] Appl. No.: 517,305

[22] Filed: Aug. 21, 1995

Related U.S. Application Data

[63] Continuation of Ser. No. 900,647, Jun. 18, 1992, abandoned.

[51] Int. Cl.$^6$ ............................................. H01H 67/00
[52] U.S. Cl. ..................... 395/200.15; 395/200.02; 395/200.11; 370/400; 340/825.02
[58] Field of Search ..................... 370/94.3, 94.1, 370/85.1, 60, 16; 340/825.02, 826, 827; 395/600, 650, 200.15, 200.11, 200.02

[56] References Cited

U.S. PATENT DOCUMENTS

| | | |
|---|---|---|
| 4,780,821 | 10/1988 | Crossley . |
| 4,825,206 | 4/1989 | Brice, Jr. et al. . |
| 4,864,559 | 9/1989 | Perlman ............................... 370/60 |

(List continued on next page.)

FOREIGN PATENT DOCUMENTS 0361649  7/1989  European Pat. Off. ......... H04L 12/18

OTHER PUBLICATIONS

IBM Technical Disclosure Bulleting, Jan. 1992, US, vol. 34, NR 8, pp. 68–71, "Scoping Multicasts in WAN Interconnected Local Networks".

Gaffin et al., "Big Dummy's Guide to the Internet", 1993, pp. 87–89.

Jo et al., "Intelligent Routing in Large-Scale Communications Systems", 1991, pp. 677–681.

Jin et al., "Performance Management in Packet Switched Networks: A New Approach to Delay Distribution Bounding for Packet Voice Service", 1990, pp. 1178–1181.

Melnitsky, "Linking a Whole New World to VMS Mail,." Mar. 21, 1988 p. 63 et seq.

Vapheas et al., "Advanced Intelligent Newtork: Evolution", 1991, pp. 941–947.

Lauder et al., "Hierarchical Network Routing", 1991, 105–114.

Perlman, "Hierarchical Networks and the subnetwork Partition Problem", 1985, pp. 297–303.

Primary Examiner—Alvin E. Oberley
Assistant Examiner—Lawrence O. Richardson
Attorney, Agent, or Firm—Edward H. Duffield; Robert O. Nimtz; Gerald R. Woods

[57] ABSTRACT

A multinode, multicast communications network has a distributed control for the creation, administration and operational mode selection operative in each of the nodes of the network. Each node is provided with a Set Manager for controlling either creation of, administration or access to a set of users to whom a multicast is to be directed. The Set Manager maintains a record of the local membership of all users associated with the node in which the Set Manager resides. A given Set Manager for each designated set of users is assigned the task of being the Set Leader to maintain membership information about the entire set of users in the multicast group. One of the Set Managers in the communications network is designated to be the Registrar which maintains a list of all the Set Leaders in the network. The Registrar insures that there is one and only one Set Leader for each set of users, answers inquiries about the membership of the sets and directs inquiries to appropriate Set Leaders if necessary. All of the set creation, administration and control functions can therefore be carried out by any node of the system and provision is made to assume the function at a new node when failure or partition in the network occurs.

6 Claims, 16 Drawing Sheets

U.S. PATENT DOCUMENTS

| | | | |
|---|---|---|---|
| 4,999,833 | 3/1991 | Lee | 370/94.1 |
| 5,005,122 | 4/1991 | Griffin et al. | |
| 5,018,133 | 5/1991 | Tsukakoshi et al. | 370/16 |
| 5,027,342 | 6/1991 | Boulton et al. | |
| 5,077,732 | 12/1991 | Flacher et al. | |
| 5,079,767 | 1/1992 | Perlman | 370/94.3 |
| 5,117,430 | 5/1992 | Bergluno | 370/85.1 |
| 5,138,615 | 8/1992 | Lamport et al. | |
| 5,218,676 | 6/1993 | Ben-Avap et al. | 395/200 |
| 5,239,653 | 8/1993 | Cubero-Castan et al. | 395/800 |
| 5,274,630 | 12/1993 | Jestice et al. | 370/58.1 |
| 5,274,643 | 12/1993 | Fisk | 370/94.1 |
| 5,276,440 | 1/1994 | Jolissaint et al. | 340/825.02 |
| 5,287,343 | 2/1994 | Nakamura et al. | 370/13.1 |
| 5,287,454 | 2/1994 | Diekmeir et al. | 395/200 |
| 5,289,460 | 2/1994 | Drake, Jr. et al. | 370/17 |
| 5,293,635 | 3/1994 | Faulk, Jr. et al. | 395/800 |
| 5,301,318 | 4/1994 | Mittal | 395/600 |
| 5,307,465 | 4/1994 | Iki | 395/325 |
| 5,321,815 | 6/1994 | Bartolanzo, Jr. et al. | 395/200.15 |
| 5,325,527 | 6/1994 | Cwikowski et al. | 395/650 |
| 5,335,347 | 8/1994 | Foss et al. | 395/650 |
| 5,345,558 | 9/1994 | Opher et al. | 395/200 |
| 5,347,272 | 9/1994 | Ota | 340/827 |
| 5,347,633 | 9/1994 | Ashfield et al. | 395/200 |
| 5,355,371 | 10/1994 | Auerbach et al. | 370/60 |
| 5,365,523 | 11/1994 | Derby et al. | 370/85.2 |
| 5,410,691 | 4/1995 | Taylor | 395/600 |
| 5,511,168 | 4/1996 | Perlman et al. | 395/200.15 |

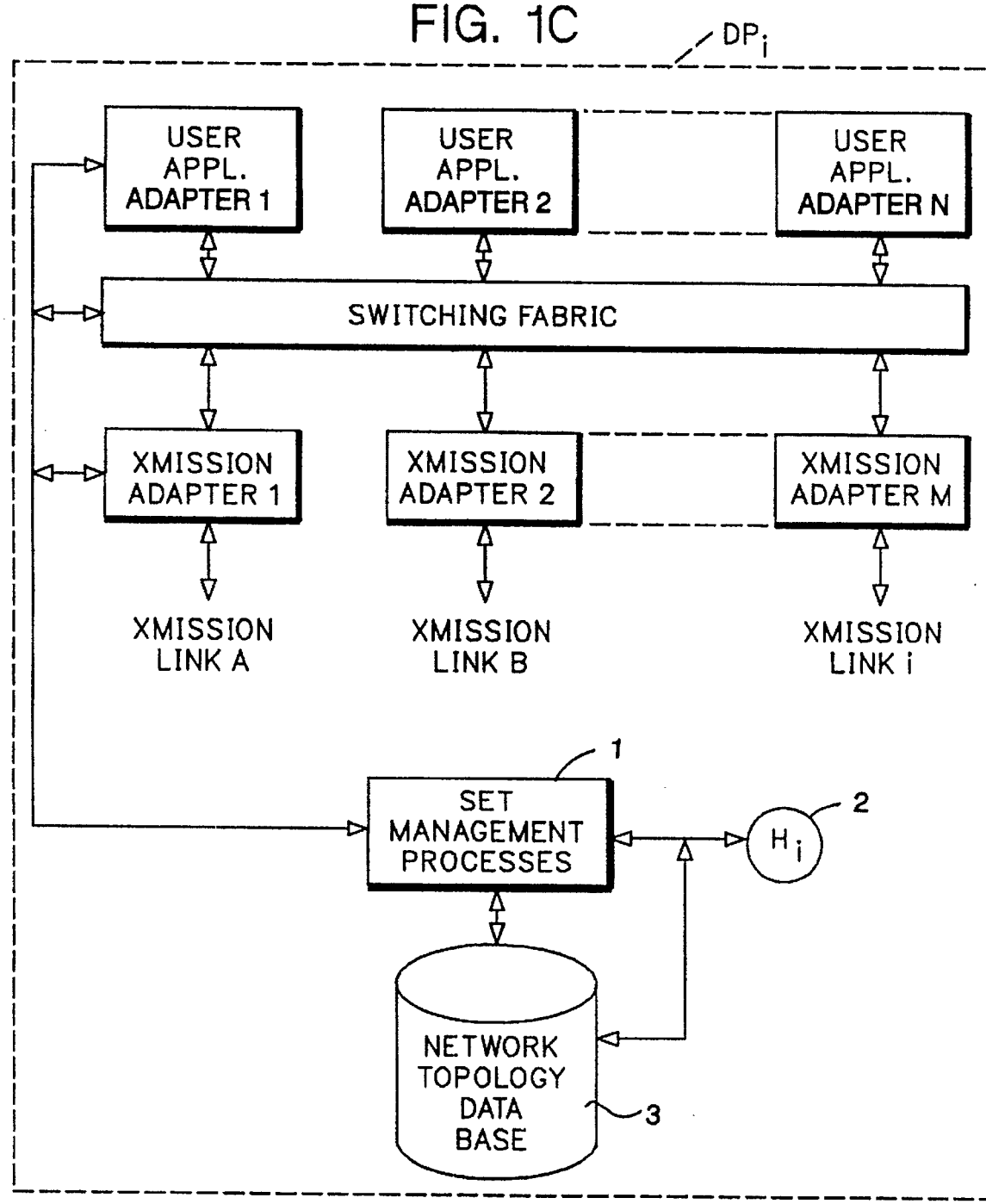

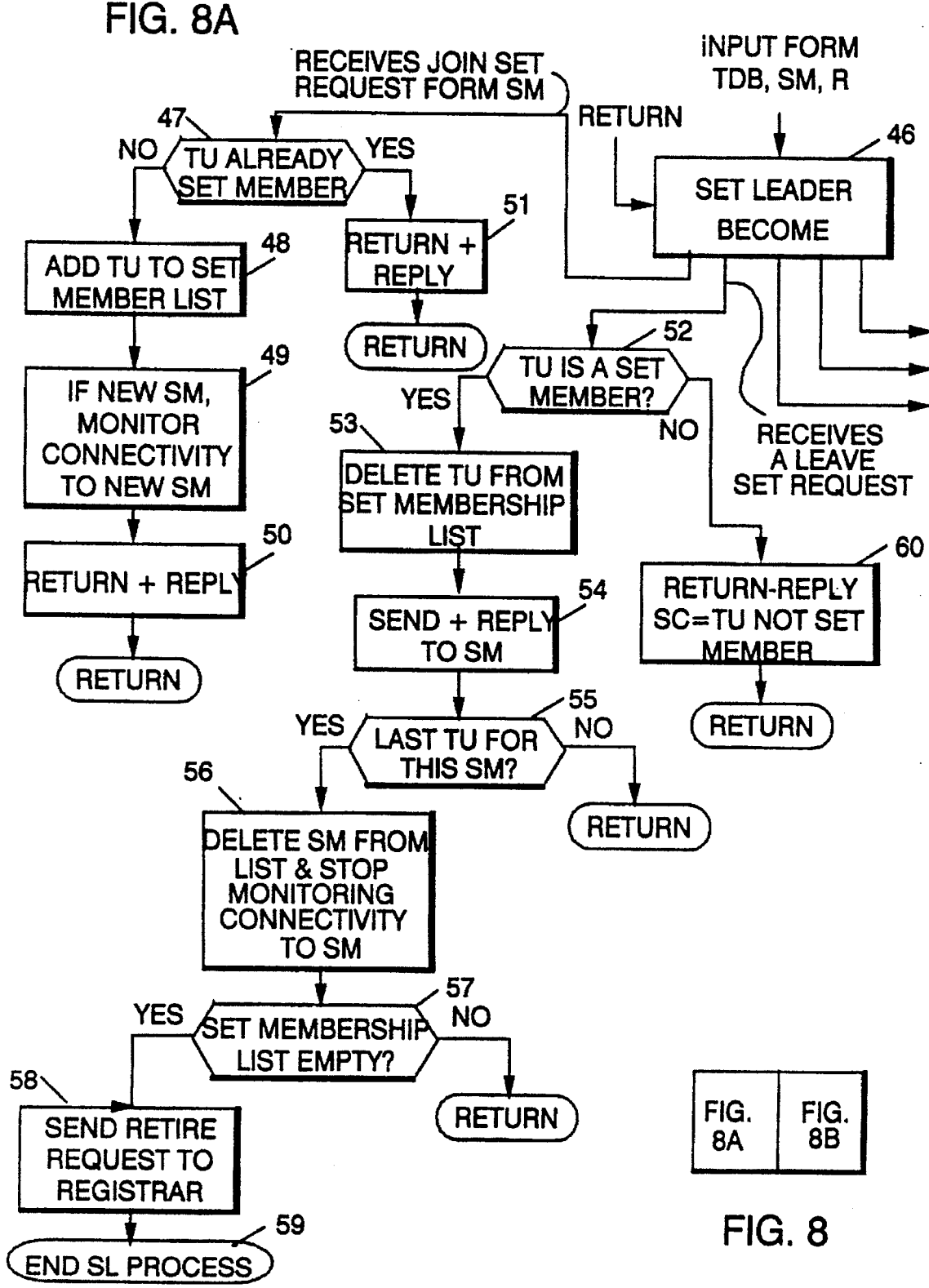

DISTRIBUTED MANAGEMENT COMMUNICATIONS NETWORK

The application is a continuation of application Ser. No. 07/900,647 filed Jun. 18, 1992 now abandoned.

FIELD OF THE INVENTION

This invention relates to digital communication systems in general and specifically to packet transmission systems involved in the management of multicast communications to a plurality of users.

PRIOR ART

Packet transmission systems in data communications networks have become commonplace in providing communications of digital data between processing centers and communications users. Such systems include a plurality of packet switching nodes interconnected with the various transmission links. Digital information is transmitted in such systems by dividing it into a number of packets, each packet having a header with all of the routing information necessary to control the switching nodes which the packet will encounter in its trip through the network from an originating node to a final destination or destinations. Packet networks originally were created for closely located data processing sites. However, packet networks are now being used in large, widely distributed data processing networks of national and international scope.

Routing protocols or methods are used to control the routing of the data packets from node to node or switch to switch through the packet transmission systems. Generally, each packet has a header that includes the routing addressing or control information necessary to direct the packet's progress from the originating node to the destination node or nodes. In multicast routing, as addressed in the present invention, routing distribution trees may be defined as a connected set of network nodes and links in which a single sender transmits the same information packets to a multiplicity of receiving nodes. Multicast tree addressing utilizes a tree address in the routing field of the packet header to direct the packet to an entire group of destination nodes. When such a packet reaches a packet switching node, the tree address in the packet header is compared to tree addresses known to the node and if a match occurs, the packet will be forwarded on all the transmission links connected to that node for which a match occurs. Multiple copies of a packet may thus be generated at each switching node to accommodate the multicast tree distribution plan.

Multicast tree routing has thus become a common method of communicating over a packet transmission network because of the efficiencies involved in utilizing a multicast tree distribution protocol. Multicast tree routing involves the creation and maintenance of a set of packet users who wish to communicate among themselves and also involves the determination of and maintenance of the optimum path for connecting the set of users to one another as has been common in the prior art.

In such systems, however, numerous problems arise if the set or group of users changes or when hardware failures occur that cause partition in the distribution network. The traditional approach to such problems has been to have a centralized database and control which monitors for such conditions in the network so that effective recovery actions may be taken. Unfortunately, this involves the periodic sending and retrieval of status information which, in a large and distributed network, requires a considerable dedication of the bandwidth of the communication system to strictly management functions involved in reporting status and monitoring the activities. If a more real-time management capability is desired, continuous monitoring and sending of status messages may be required and this is not only difficult to administer, but is quite consumptive of transmission resource. Such systems become unwieldy or even intolerable where numerous, real-time messages must be transmitted such as in the case of multi-media audio and video systems in which the audio and video data must be synchronized in their transmission and receipt at the various nodes.

OBJECTS OF THE INVENTION

In view of the foregoing known difficulties with the prior art multicast networks and distribution schemes, it is an object of the present invention to provide a new form of communication network and control in which each of the users having membership in a multicast set is controlled and administered independently from the creation and utilization of the distribution or transmission paths used to communicate among the members of the set.

Yet another object of the invention is to provide a distributed control over the sets of users or groups in a multicast network by providing at all of the communicating or switching nodes in the network the capability for creation, administration and control over the user sets.

BRIEF SUMMARY OF THE INVENTION

In accordance with a preferred embodiment of the invention that will be illustrated herein, the problems involved in the creation and control of multicast distribution within a digital packet network are solved by separating the administration and control of user groups who wish to communicate in a multicast system from the administration and control of the communication paths making up the multicast network itself. Control over the user groups or sets is facilitated by providing at each node in the network the full menu of capabilities required for the creation of, administration of and control of the user groups or sets.

The chief characteristic for providing these capabilities is herein called a "Set Manager" (SM), one Set Manager being located at each node in the network. The Set Manager maintains a record of all of the local memberships of users in sets which it serves. The users are called Transmission Users (TUs) associated with the node where each Set Manager function resides. A Set Manager for each set is designated as a Set Leader (SL). The Set Leader maintains the membership information about the entire set of TUs in a given group, not just any local members served by the node which is acting as set leader. In addition, one Set Manager in the packet communications network at an arbitrary node is designated as Registrar (R). The Registrar maintains a list of all the Set Leaders for all of the multicast user sets or groups that may be defined in a given network. The Registrar's function is to insure that there is one and only one Set Leader in each set or group of users designated to answer the inquiries about the set's membership or to direct inquiries to an appropriate Set Leader if the information happens to not be available at the Registrar. All of these set creation and administration functions may be carried out at any node in the system by control means in that node and provision is made to allow another node to assume the functions of an acting Set Leader or Registrar when failures in the network that cause partitions or other disruption occur, by providing identical control means in each node of the network.

Efficient protocols for the communication of control and coordination information among the Set Managers at the various nodes in the network greatly reduce the system resource overhead dedicated to maintaining status information since each Set Manager fulfills a portion of set management and communications management functions with only a limited need to communicate with other Set Managers or functions to perform its duty.

BRIEF DESCRIPTION OF DRAWINGS

The foregoing and still other objects of the invention that have not been specifically enumerated are provided in a preferred embodiment further described and illustrated with respect to the drawings in which:

FIG. 1C illustrates an individual decision point from such a prior art node but including the set management processes and capabilities to make a given node effective as a Set Manager in accordance with the preferred embodiment of the present invention.

FIG. 8 schematically illustrates the layout comprised of FIGS. 8A and 8B.

FIGS. 8A and 8B schematically show the procedural flows and protocol when a Set Manager becomes the Set Leader.

DETAILED DESCRIPTION OF PREFERRED EMBODIMENT OF THE INVENTION

As noted above, control of the network in the preferred embodiment of the invention is facilitated by providing user set creation, administration and control capabilities in all of the nodes of the packet communications network. The chief characteristic of these capabilities is summarized as a Set Manager (SM) located at each node. The SM maintains a record of all the local Transmission Users (TU) who are members in the user groups or sets and which are served locally by the node in which the Set Manager resides.

One SM for each user group or set is designated as the Set Leader (SL). The SL maintains membership information about the entire set of TUs in a given group or set, not only the local members served by that particular Set Manager.

Finally, one SM in the network is designated as a Registrar (R). The Registrar maintains a list of all of the SLs in the network and of their user lists. The function of the Registrar is to insure that there is only one Set Leader for each user group or set and to answer inquiries regarding the set membership or to direct such inquiries to an appropriate Set Leader if the information happens not to be available at the the Registrar. All or any subset of these several administration functional designations may be implemented and carried out by any node of the system, i.e. network. Provision is made at each node to assume the functions of a failing node when failures of a node occur or a network partition occurs due to failure of a communication link.

Figure 1A:
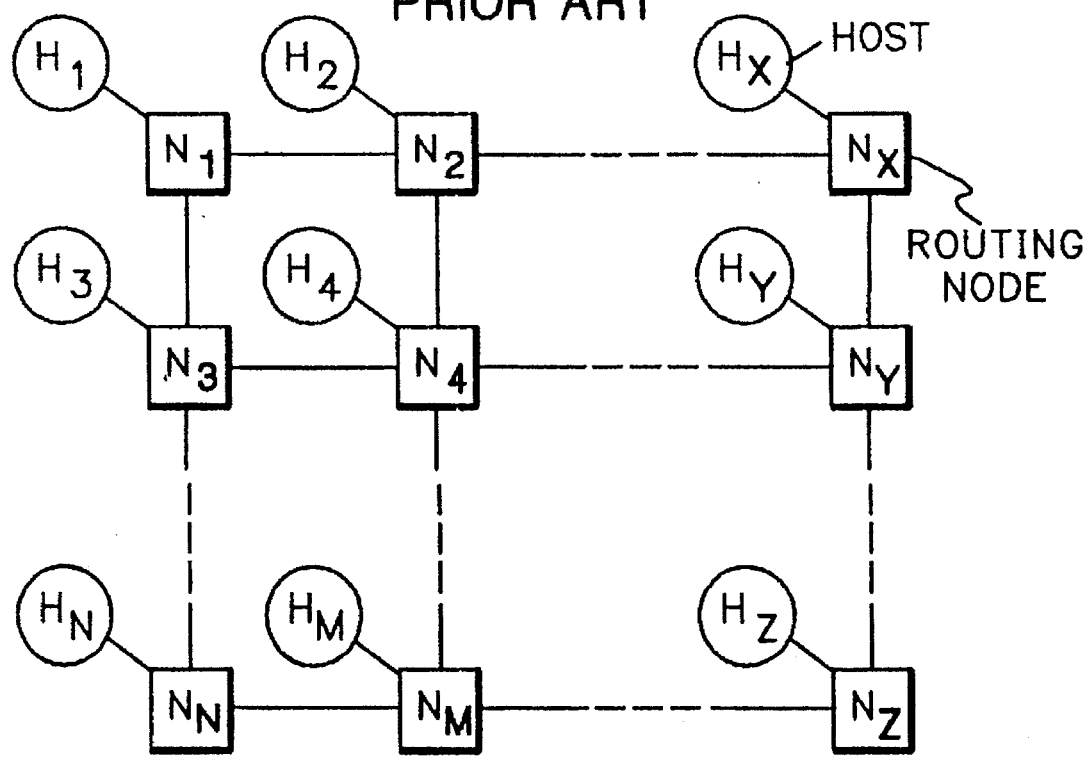
FIG. 1A illustrates a typical schematic view of a prior art orthogonal switching network comprised of a plurality of nodes, each node having an associated host processor or computer.

Prior to illustrating the preferred embodiment in detail, some background terminology and information is necessary. FIG. 1A illustrates the schematic layout of a typical packet communications network of the prior art in which a plurality of nodes $N_i$ are interconnected by communication links, each node being served by an associated host processor or computer $H_i$ which contains or has access to the network configuration topology database (FIG. 1C) and which contains the appropriate control process code to perform the functions required to control the switching and communication at each node $N_i$.

Figure 1B:
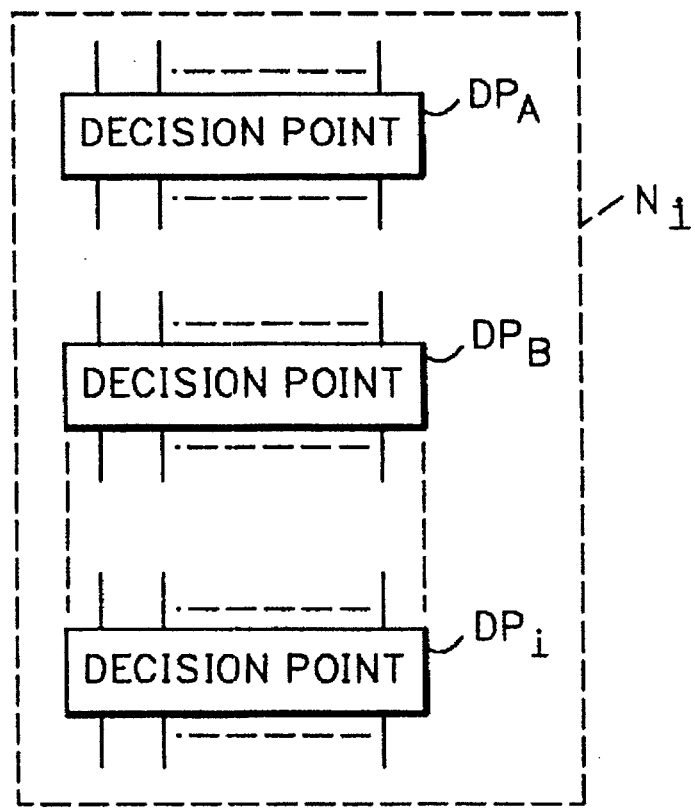
FIG. 1B illustrates a prior art typical switching or routing node containing one or more decision or switching points.

FIG. 1B illustrates the typical prior art node $N_i$ in greater detail showing that a plurality of decision points $D_{P_i}$ may be included in each node. The decision points are the route switching decisions made by the node to determine that an incoming message on one link is destined for one or more outbound links depending upon routing information contained in a packet message.

FIG. 1C illustrates a typical decision point $DP_i$ in greater detail showing that a switching fabric is used to interconnect one or more user applications addressed through application adapters to one or more incoming or outgoing transmission links via transmission adapters. The management of the switching fabric is under the control of the host computer $H_i$ which has access also to set management processes for groups of users in a multicast set and to the network topology database for determining the addresses, locations, etc. of the members of a group or groups within the network.

In accordance with the preferred embodiment of the present invention, multicast user sets or groups of TUs may be created at will by any TU in the network. Such sets may be "open", in the sense that terminal nodes or user nodes can join or leave the set at any time and at their own volition or "closed" in the sense that membership is limited to a preselected set of users arbitrarily dictated by the user which formed or created the initial set. In the present embodiment of the invention, distributed control over the creation, administration and of multicast user groups or sets is defined by a set of protocols and processes resident in each node either as shown by the set management processes in FIG. 1C or contained within the host $H_i$ serving the node. Partition of the network caused by link failures may be noted by monitoring messages transmitted between Registrar, Set Leaders and TUs in accordance with the preferred embodiment of the invention. If a failure results in partition of a transmission user group or set, the separated subsets so formed must be reconstituted into separate sets having their own Set Leaders and Registrars. To this end, the Registrar in the original network detects the loss of a Set Leader and deletes that Set Leader from its list of Set Leaders. When a Set Leader detects the loss of the Registrar, the Set Leader contends for and may actually become the Registrar itself for its own network subset. If it does become Registrar, it accumulates all of the necessary information from the Set Leaders which it serves. When a Set Leader detects the loss of a Transmission User or Set Manager, the Set Leader alters the membership in its set by deleting the affected user or users. Finally, a Set Manager which detects the loss of its Set Leader may become the Set Leader itself and accumulate all of the necessary information from users that it will serve. The actions in these various functional capacities take place automatically in accordance with a preferred embodiment of the invention by following methods described by procedural flowcharts implemented in appropriate control instructions accessed by and executed by the host computer at each node.

When failure in a link is repaired and subsets are to be joined or reunited into a complete user set, one of the Registrars will be redundant and must be arbitrarily removed. The Set Leaders registered with the deleted Registrar must then register with the original Registrar and send their membership lists to it. One subset Set Leader must also surrender its set leadership to the other subset Set Leader upon rejoinder of the network partitions. To accommodate transmission users who will still not be aware of the change in set leadership, the deleted Set Leader will become a Surrogate Set Leader and forward the set membership list to the actual Set Leader, thus making an instantaneous reformation of all of the sets unnecessary since the system or network may recover and reform over time without creating a sudden avalanche of messages transferring leadership, member lists, etc.

Returning to FIG. 1A, a general schematic block diagram of a typical packet communications network having a number of routing nodes $N_i$ arranged in a regular two dimensional lattice is shown. The nodes $N_i$ may, however, be arranged in any graphically interconnected arrangement with each node having a plurality of incoming transmission lengths and a plurality of outgoing transmission links and with the pluralities of incoming and outgoing links being not necessarily equal. Each node $N_i$ is also associated with a host computer $H_i$ which performs all of the storage, routing and control functions necessary to the operation of the switching node. Each node, as directed and controlled by its respective associated host computer, is capable of routing data packets from any of its incoming connected transmission links to any of the outgoing transmission links or to any group of them.

As shown in FIG. 1B, each node comprises one or more decision points $DP_i$ which in turn are disclosed in more detail in FIG. 1C which also includes portions of the preferred embodiment of the invention.

In a packet communications network such as shown in the prior art FIG. 1A, routes for packets are calculated before sending such packets into the network, but the actual communication links interconnecting the nodes may not be dedicated to that packet until its receipt is detected at a given switching node. Each link in the route will then be designated in response to routing information contained in the header portion of the packet. Incoming data packet headers at a given node are examined to determine the appropriate outgoing transmission link or paths on which the packet should be forwarded. In response to the header information, the packet will be actually connected and distributed to the appropriate outgoing link or links at a decision point $DP_i$ or points within the node.

Decision points $DP_i$ within a node are shown in FIG. 1B. Each of the switching nodes comprises one or more subnode decision points $DP_i$, each having a plurality of incoming transmission paths and a plurality of outgoing transmission paths. Packets to a subnode decision point $DP_i$ may come from remote switching nodes in the network, from decision points within the same switching node, or from user applications (TUs) accessing the packet network at that given switching node $N_i$. The availability of more than one decision point allows each node $N_i$ to handle any number of incoming or outgoing transmission links since each link may be multiplied by connection to another decision point. A large plurality of local user applications can therefore be accessed through each switching node by the use of the multiple switching points.

As shown in FIG. 1C, a typical subnode packet decision point $DP_i$ from FIG. 1B may comprise a patching or switching fabric SW and a plurality of adapters which may be selectively interconnected by the switching fabric. "Switching fabric" is a term of art intended to identify any mechanism for providing appropriate receipt from and distribution onto one or more paths of digital signals. The switching fabric may comprise, for example, a time divided communications bus onto which digital signals are written and from which they are read in time slots accessed by two adapters that are to be connected to one another. The adapters shown in FIG. 1C may be of two general types, namely Transmission Adapters for connecting to intranode or internode links and user Application Adapters for connecting to users of the packet network (TUs). The user and transmission adapters can each be mixed in any proportion at any decision point in any node depending only on local requirements of the users. Users may be connected to the packet switching system at any node or subnode by means of user Application Adapters as shown in FIG. 1C.

The adapters and the switching fabric at any decision point and any node are all controlled by packet multicast set management facilities or programs (1) executed by the host computer, (2) as shown in FIG. 1C. Obviously, these functions could also be implemented in special purpose circuits, but software programs are more flexible and more easily changed. The functions of user set management facilities are actually a group of processes which rely on data retrieved from the network topology database 3 that contains and maintains an up-to-date record of all of the user resources and transmission resources available in the entire network. Resource records in the network topology database are used in calculating transmission paths between originating and destination user applications and in calculating distribution paths for interconnecting sets of users.

Figure 1D:
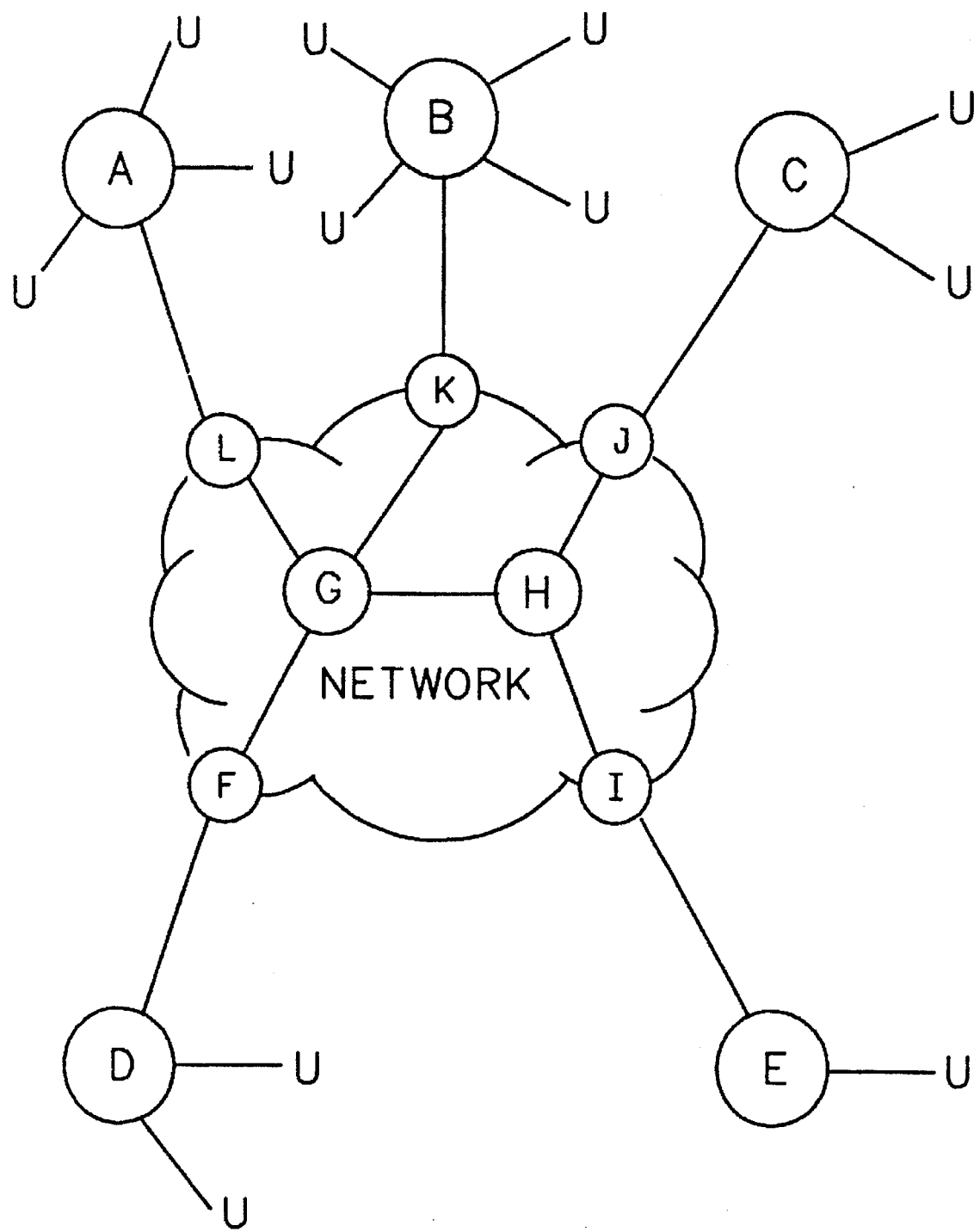
FIG. 1D illustrates schematically a network comprised of nodes A–L with some of the nodes having attached transmission users identified by links to the small letter u.

FIG. 1D schematically reillustrates a hypothetical network comprised of a plurality of nodes A–L in which the nodes may be interconnected by a plurality of communications links as shown to serve locally connected users at each node as shown. In accordance with the preferred embodiment of the invention, each node comprises a set of management processes or props (1) from FIG. 1C which may be invoked to carry out functions of being a Set Manager for one or more transmission users served by a given node, a Set Leader for an entire set of users that may be supported over the network comprised of a plurality of nodes, a Surrogate Set Leader when separate subnetworks or partitioned subnetworks have been rejoined and as the overall network Registrar as has been alluded to earlier.

Figure 2A:
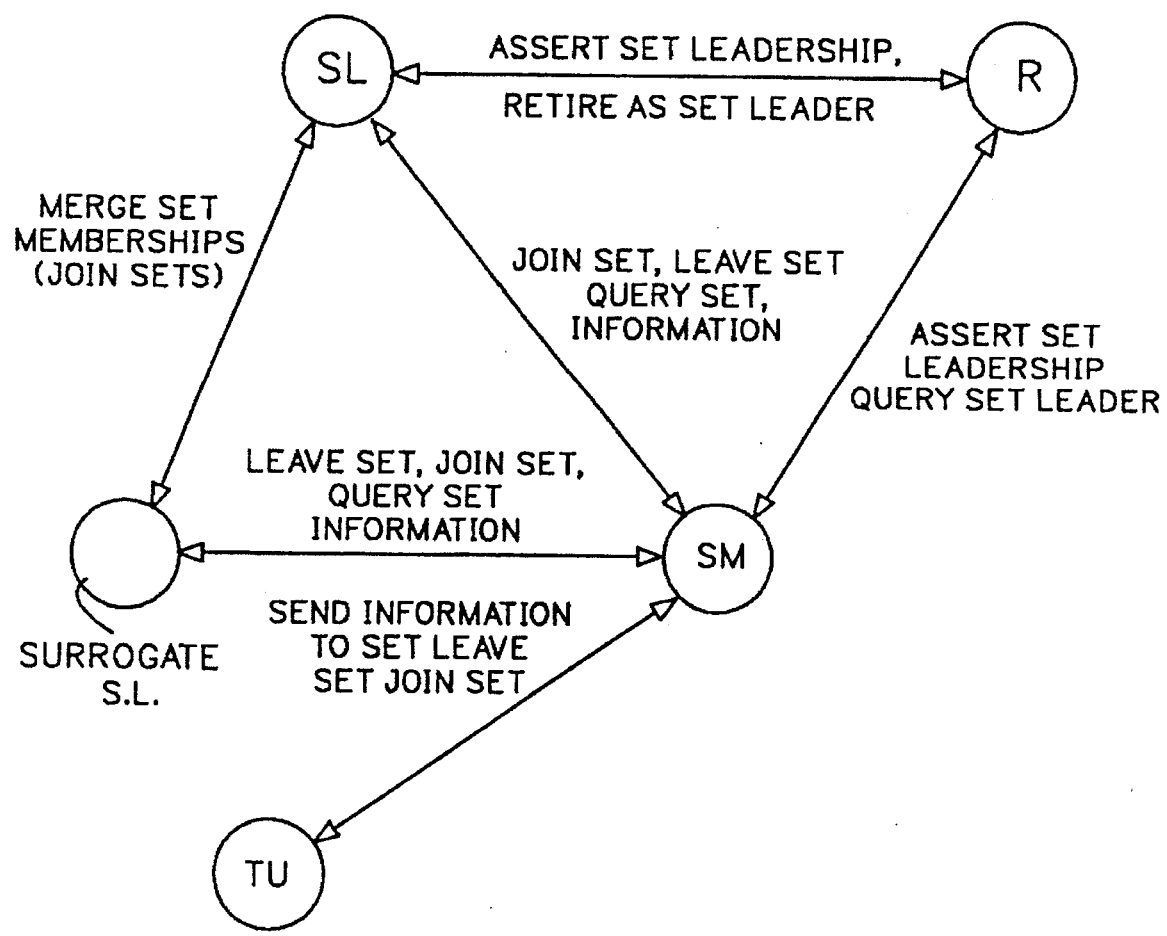
FIG. 2A schematically illustrates protocol message flow between various functional units designated the Set Manager, a Transmission User, Registrar, Set Leader or Surrogate Set Leader in accordance with the present invention.

FIG. 2A illustrates in a schematic fashion the message protocols exchanged by a Set Manager either with itself acting in the capacity of Surrogate Set Leader, Set Leader or Registrar or with other nodes where the Set Managers have implemented such functions. A given Transmission User TU as shown in FIG. 2A wishing to enroll in a set must communicate its desire to join a set to its local Set Manager residing in the node to which the given TU is attached. In making such a request, the TU must give the group ID of the group or set of users that it desires to join, the requesting TU's address and an indication if any specific authorization will be required such as an encryption or decryption key used in communicating with members of the set. The TU may also leave or "resign from" a defined set by sending the group ID and its own requesting TU address to its servicing Set Manager with an indication that it wishes to leave an established set having the given group ID. It may also send information to the set as a group multicast with or without being a member of the set by sending a message to the Set Manager that it has information to be distributed to a given set known by a given set ID. The Set Leader, in turn, receives this message and queries the Set Leader for the members of the set for delivery of the message thereto.

Upon receipt of a request to join a set from a locally supported TU, the Set Manager serving the TU must either know the identity of the assigned functional Set Leader for the set, learn it or assume it.

In the preferred embodiment of the invention, this is achieved by having the Set Manager that happens to be unaware of the identity of the Set Leader for a given identified set assert itself as a Set Leader by sending a message to the Registrar for the network. The identity of the Registrar of the network is ascertained by the Set Manager via executing code in one of the set management processes (1) of FIG. 1C to access the network topology database (3) to learn the address and location for the network Registrar. Having ascertained the address of the network Registrar, the Set Manager sends an Assert Set Leadership message giving the group ID for which leadership is desired and including the requesting Set Manager's network and node identification.

The Registrar will reply either with the identity of the current Set Leader for the group ID by giving the current Set Leader's identity by network ID, and node ID or will respond with the requesting Set Manager's network ID and node ID, thus indicating that the requesting Set Manager's has assumed Set Leadership. Also a given Set Manager may inquire whether a Set Leader exists for a given set by directing a message to the Registrar as shown schematically in FIG. 2A. The Set Leader as shown in FIG. 2A may also assert Set Leadership or retire as the Set Leader by sending appropriate messages to the Registrar. The form and content of the message or request is the same as that discussed for the Set manager and the replies from the Registrar are of similar format.

Once the Set Leader for the identified set has been identified, the Set Manager must send a message to the Set Leader requesting the joining of its originally requesting TU into the set. This message passes from the Set Manager either to the Set Leader or to the Set Leader acting as Surrogate Set Leader, whichever has been made known to the present Set Manager as the present Set Leader for the given set. The request to join a given user set includes the group ID of the set, the requesting TU's address and the Set Manager's network ID and node ID. The reply from the Set Leader or Surrogate Set Leader to the Set Manager has a reply type indication, the group or set identification, the Set Leader's network ID and node ID and a sense code as will be described in greater detail later.

A request to leave the set must come from a TU to its Set Manager and the Set Manager transfers the request to the Set Leader or the Surrogate Set Leader. This request includes the group ID from which a transmission user wishes to resign, the requesting TU's address and the Set Manager's network ID and node ID.

A reply from the Set Leader or Surrogate Set Leader includes a reply type, the set ID or group ID, the Set Leader's net ID and node ID and a sense code for purposes that will be described in greater detail later.

A given Set Leader may retire as Set Leader by sending an appropriate request to the network Registrar including the Set Leader's Set Manager net ID and node ID and the group or set ID for which it wishes to retire as Set Leader. The reply from the Registrar indicates the type of reply, the group ID whose leadership will be resigned and a sense code for purposes that will be described later.

Merging of subsets in the network due to reestablishment of a link whose earlier rupture may have caused partition of the network into subsets is accomplished by forwarding a "merge set membership" request from a Surrogate Set Leader to the new or actual original Set Leader. This request includes the set or group ID, the Surrogate's net ID and node ID and the set membership list comprised of the TU addresses which the Surrogate has been serving. The reply from the original Set Leader to the Surrogate includes a reply type, the set or group ID and a sense code for purposes that will be described later.

Figure 2B:
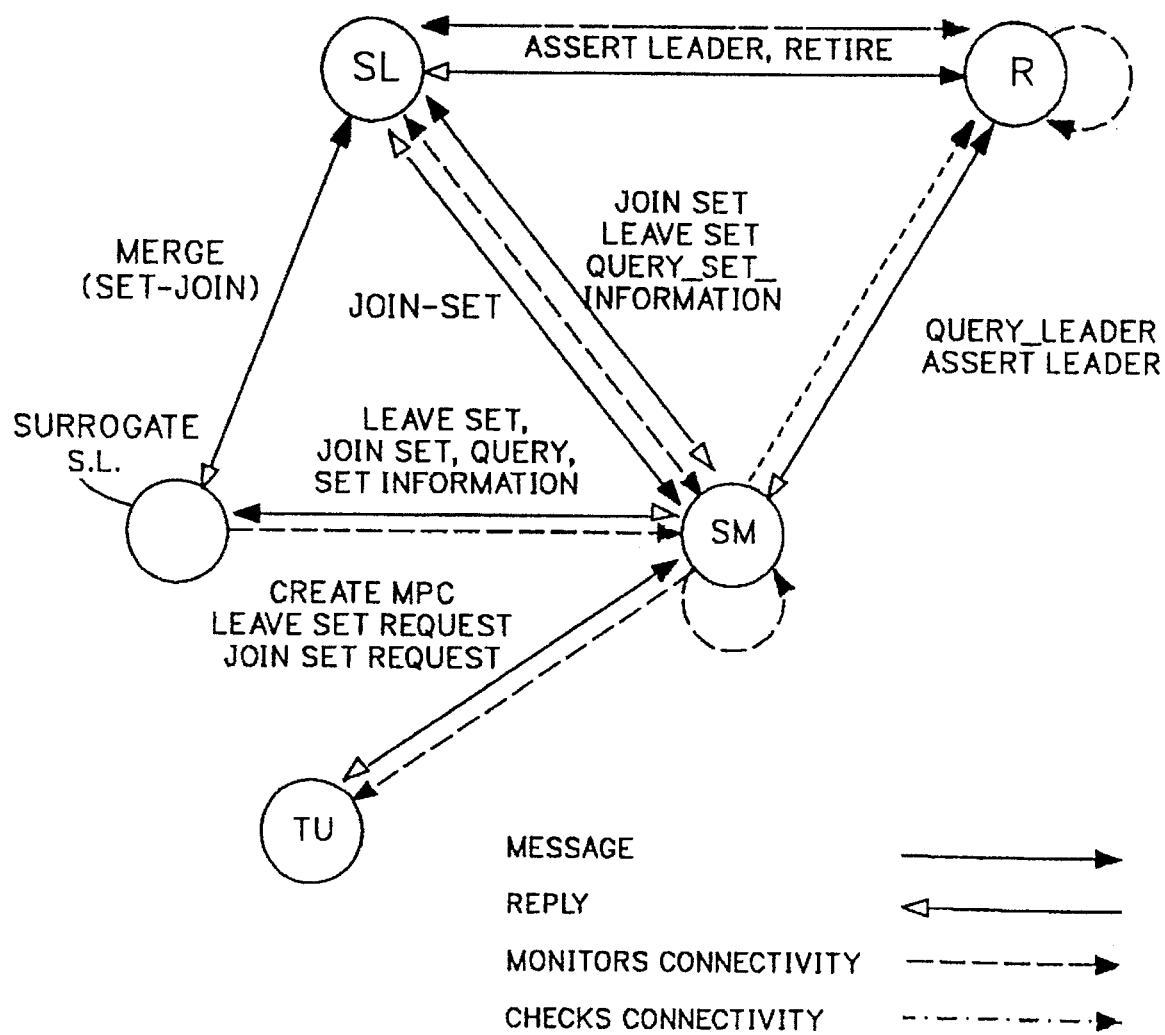
FIG. 2B illustrates the specific message flows in the protocols to manage the network with distributed Set Mangers operating in various capacities in accordance with the preferred embodiment of the invention.

FIG. 2B illustrates the set management protocol or message flows in an open set. The key in FIG. 2B illustrates both the direction of message flow and whether or not connectivity is monitored or periodically checked.

Figure 3:
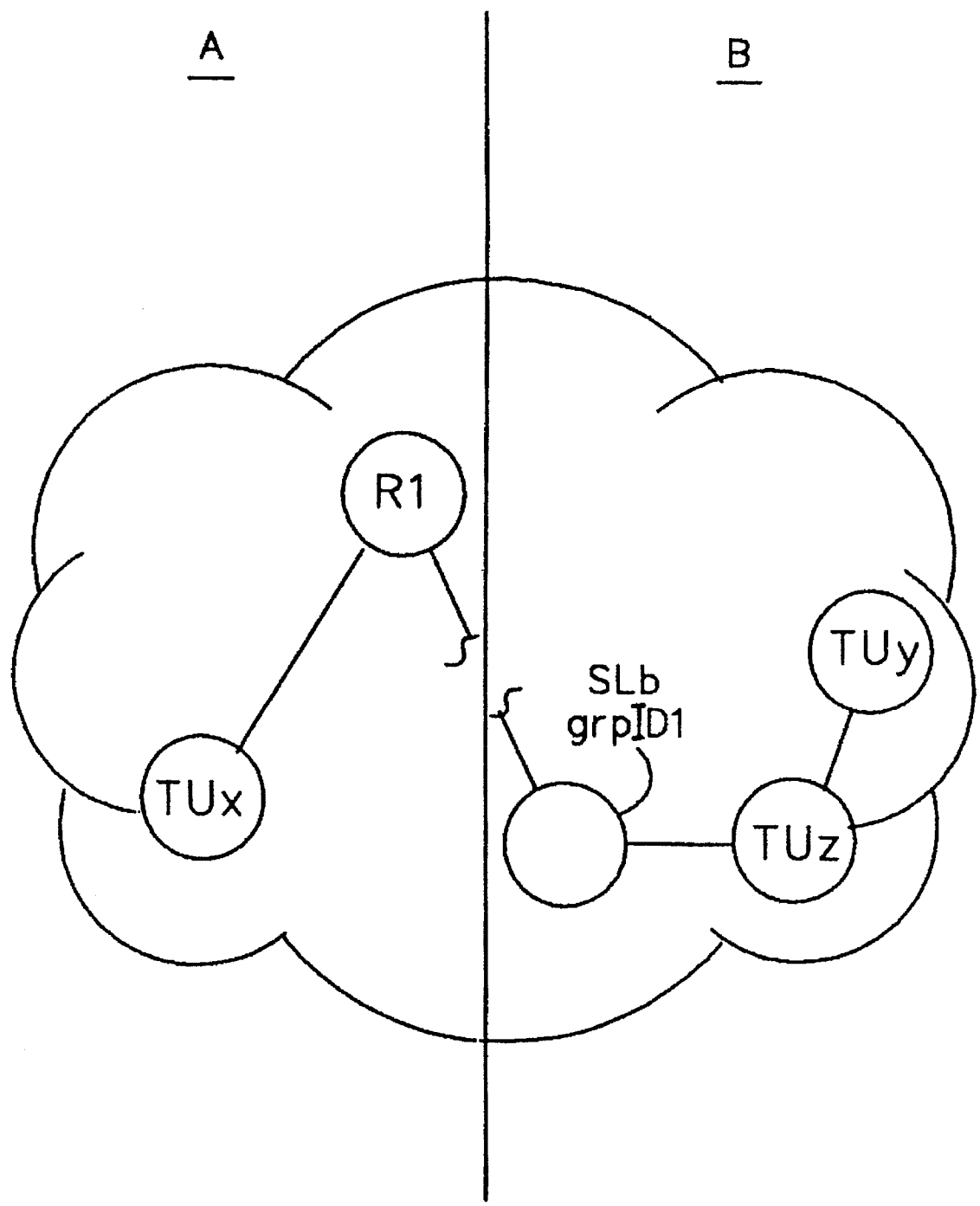
FIG. 3 illustrates schematically a network configured in accordance with the preferred embodiment in which a partition into two portions occurs by virtue of a break in a link in the communications network.

FIG. 3 illustrates partition of a network into two halves, A and B, due to the breakage of a link joining the Registrar R1 with the Set Leader SLb for group ID1.

Figure 4:
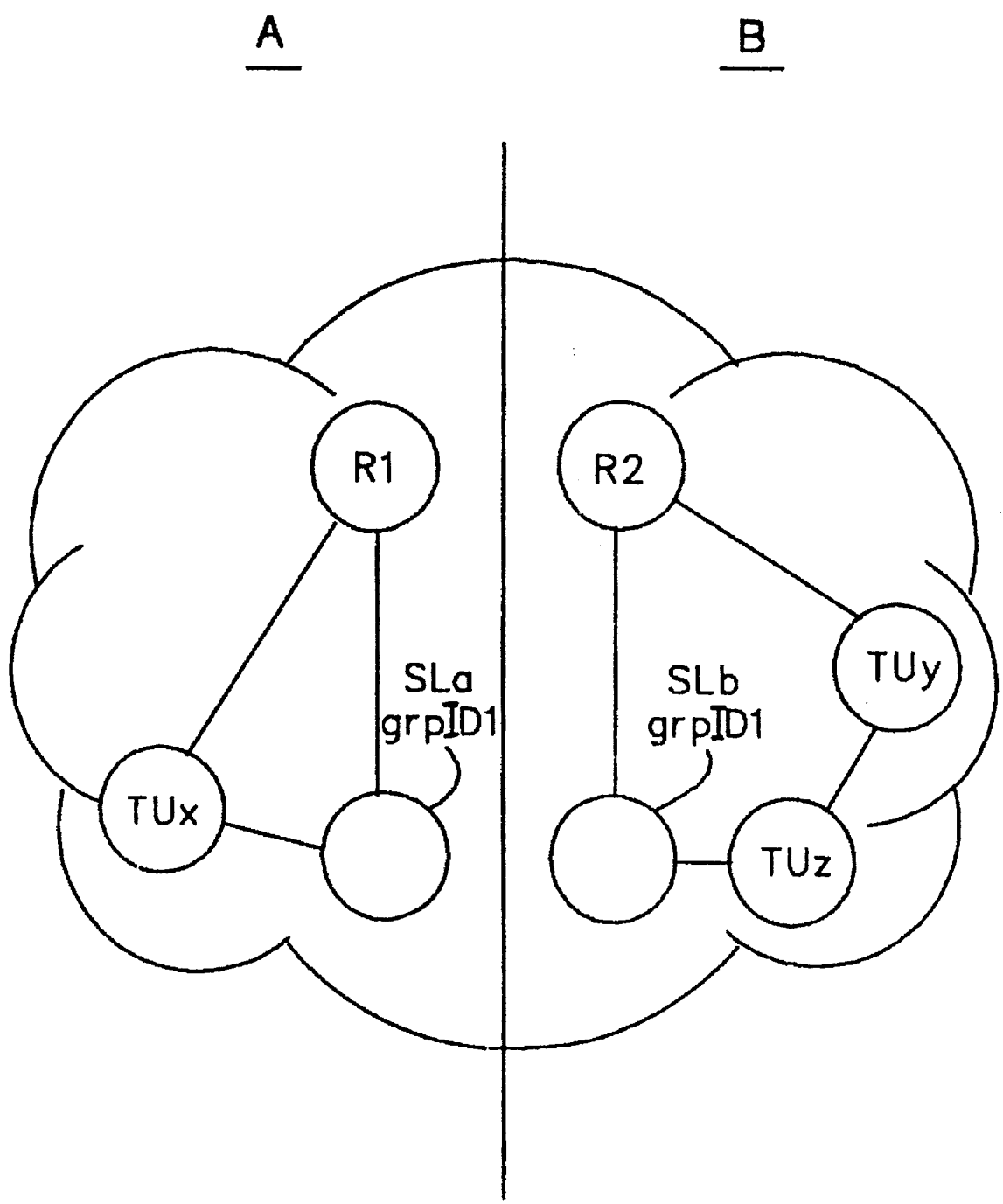
FIG. 4 illustrates a recovery from a network failure causing partition in the network in accordance with the present invention.

FIG. 4 illustrates the reconfigured subnetworks A and B where subnetwork B has assigned a new Registrar R2 and subnetwork A has assigned a new Set Leader SLa group ID1 in accordance with processes illustrated in the process flows that will be described shortly.

All of the foregoing messages communicated between the functionally acting Set Managers performing the duties of Set Manager, Set Leader and Registrar are controlled and created in response to the execution of program processes at each Set Manager node that will be described in greater detail with reference to FIGS. 5–10 which follow.

Figure 5A:
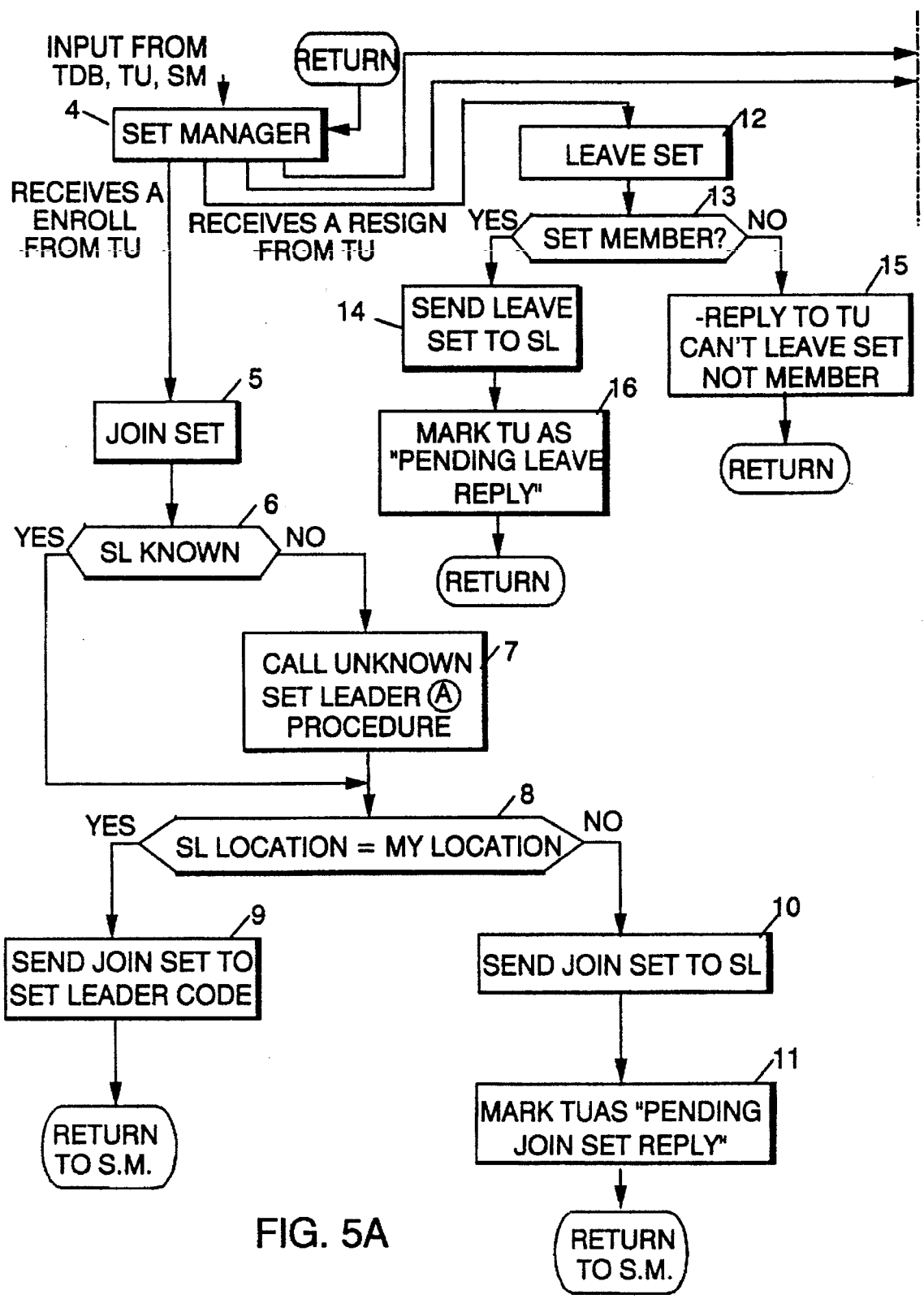
FIG. 5 illustrates a flowchart of the protocol and process invoked by a Set Manager at each node for the functions of enrolling a transmission user served by the node into a group multicast set, resignation of a user from a set, joining of a transmission user into a set as communicated to a Set Leader or the receipt of a topological database update message indicating the Set Leader has failed.
Figure 5B:
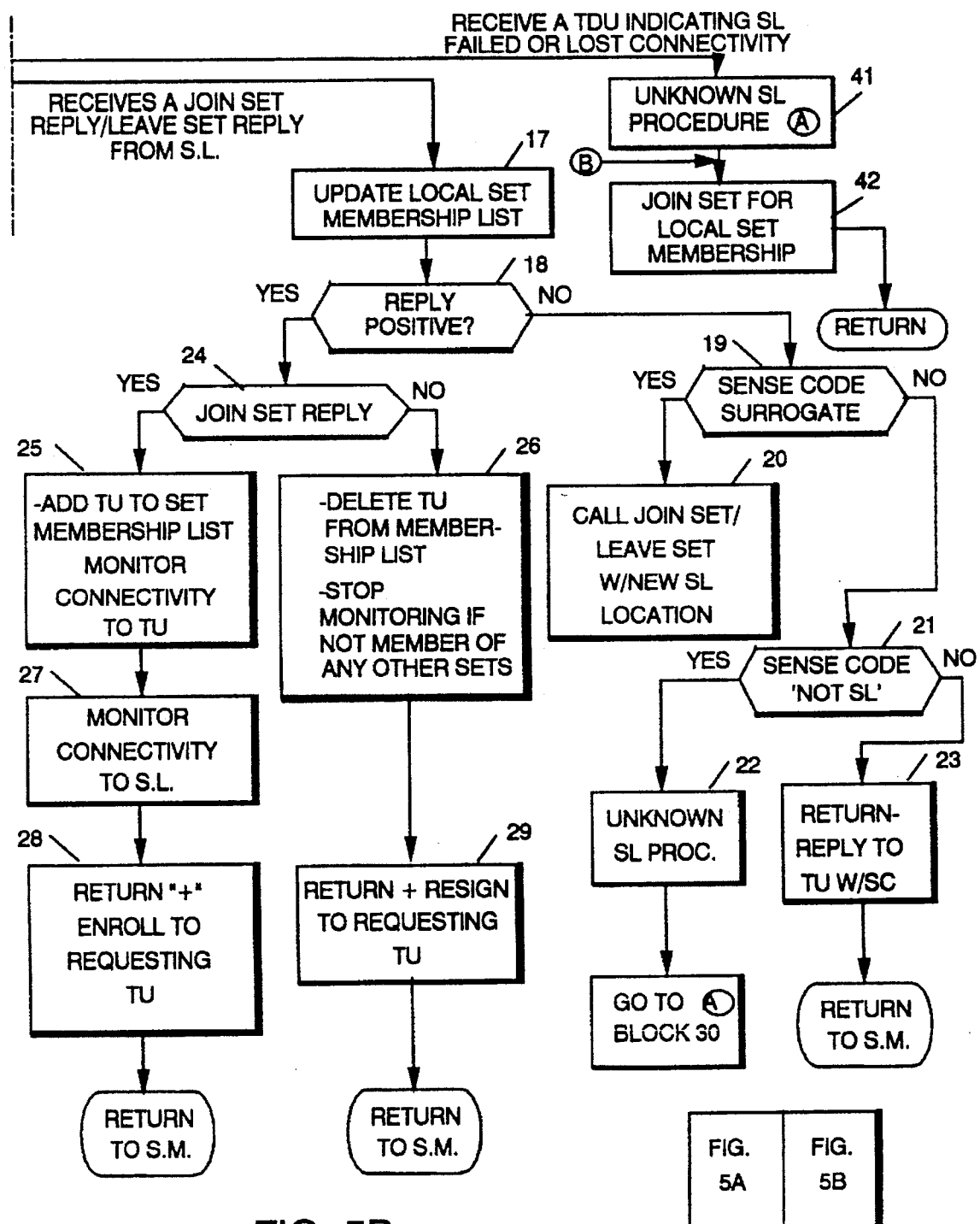

FIG. 5 illustrates the main flows of the Set Manager operating processes at each node. Input to the Set Manager process comes from the topology database (TDB) from the transmission users (TU) and from the Set Leader and Registrar. Set Manager initiation block 4 in FIG. 5 is the starting point.

When a transmission user desires to enroll in a user group or set, a request therefore is received by the Set Manager 4 and interpreted in block 5 as a request to join the set. A check is made in block 6 as to whether the Set Leader is known to the Set Manager. If the answer is yes, the Set Manager checks to determine if the Set Leader is actually itself in block 8. If the answer is no, it sends the join set request from its serviced TU that is desiring an enrollment in a set to the known Set Leader as shown in block 10 and in block 11 the Set Manager marks its own list for the TU that was requesting enrollment as pending enrollment and awaits a join set reply from the Set Leader. This process then returns to the start in block 4.

Figure 6:
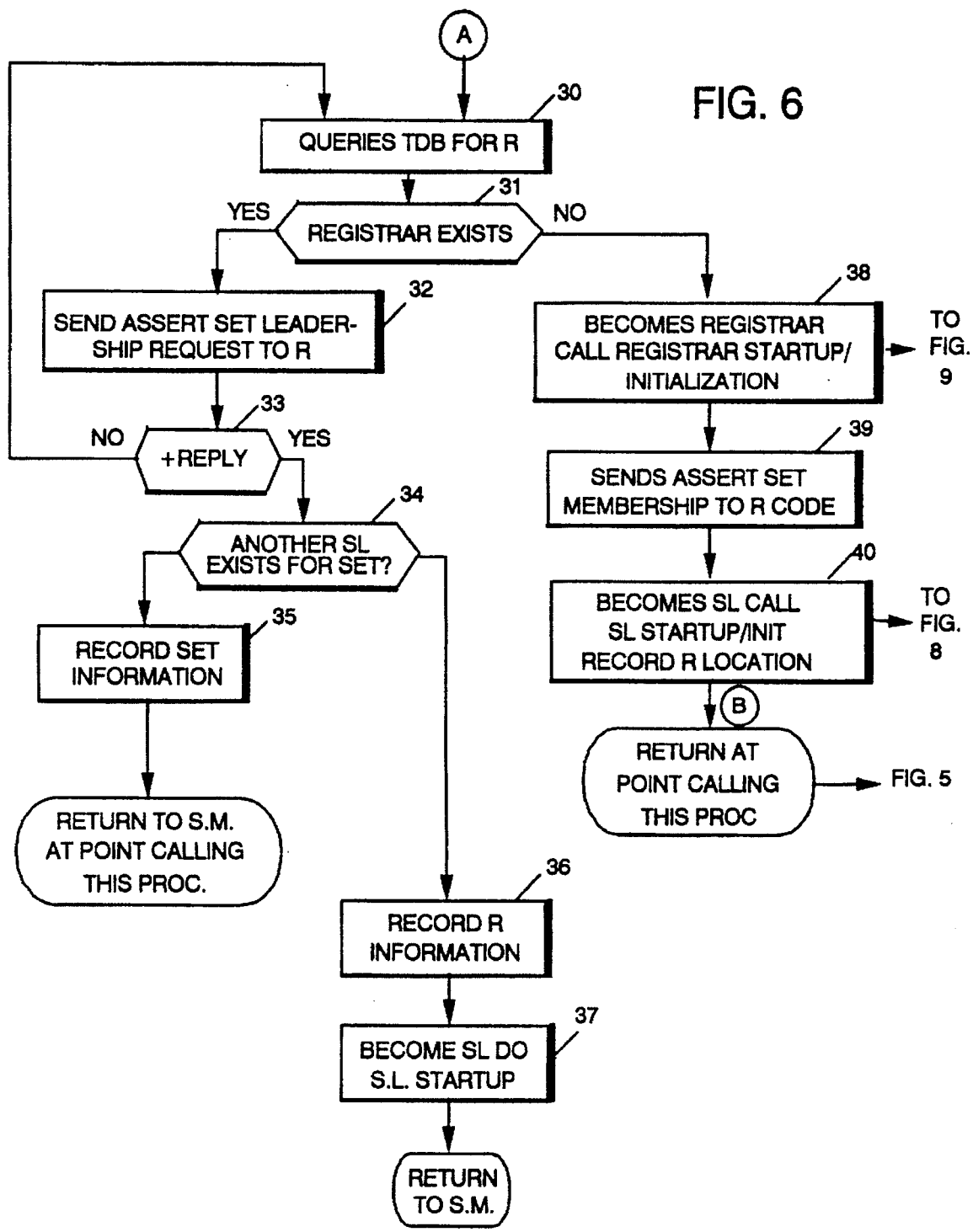
FIG. 6 illustrates the procedural flow invoked when a Set Leader is not known for a given set by a Set Manager.

If, however, in block 6 the Set Leader is not known, block 7 is entered and a separate routine called the unknown Set Leader procedure in block 30 of FIG. 6 is called. This will result in identifying the Set Leader back to the Set Manager and will be described in greater detail later since its operation then flows to block 8 of FIG. 5 and is processed in the same fashion described above. When the check in block 8 is made as to whether the Set Leader is the actual set manager, it may be found that the local Set Manager is in fact the Set Leader for the identified set which the TU is requesting to join. If the answer is yes in block 8, block 9 is entered and a join set enrollment message is sent to the Set Leader code process running within the same node which follows the flows given in FIG. 8 that will be described later. Exiting from block 9, the process returns to the Set Manager input block 4.

If the Set Manager 4 receives from a serviced TU a request to resign from a set, the process enters block 12 which interprets the request as a request to leave the set. A check is made in clock 13 as to whether the requesting TU is presently a member of the set. If the answer is no, a reply is generated in block 15 to inform the TU that it cannot leave since it is not a set member currently and the system returns to the start. If the TU is a member of the set, however, block 14 is entered and a leave set request is sent to the known Set Leader and a notation is made in block 16 by the Set Manager code for this TU as "pending a leave request reply" and the system returns to the start in block 4.

If the Set Manager 4 receives the necessary reply from the Set Leader to acknowledge a joining of the set or leaving of a set, block 17 is entered to update the local Set Manger's TU membership list or lists for the various sets for which it may have records. Block 18 checks as to whether the reply is positive and if it is and it is a join set reply, this is detected in block 24. If a join set reply is present, the requesting TU's identification is added to the set membership list maintained by the Set Manager and the Set Manager monitors its connectivity to the requesting TU as shown in block 25. In block 27 the Set Manager also begins monitoring connectivity to the know Set Leader if it is other than the present Set Manager. In block 28 the Set Manager returns a positive enroll signal to the requesting TU so that it knows that it is enrolled in the desired set. Then the process returns to the start. If the test in block 24 detects that it is not a join set reply, block 26 is entered and the TU is deleted from the membership list maintained by the Set Manger and monitoring of connectivity to the TU is ended. Block 29 is entered and a positive resignation request signal is returned to the requesting Tu so that it knows that it has been disenrolled from the identified set. Then the process returns to the start.

If, however, in block 18 a negative reply is detected, block 19 is entered to check a sense code which is transmitted as a part of the format of a response from a Set Leader or Registrar. Block 19 checks whether a sense code indicating that the Set Leader is acting as a Surrogate Set Leader is present. If the answer is yes, block 20 is entered and a routine is called to initiate the join set or leave set operations with a new Set Leader location that will be indicated by the sense code from the Surrogate Set Leader indicating who the new Set Leader actually is. If the sense code Surrogate Set Leader is not present in block 19, block 21 is entered to check whether the sense code indicates that the responder is not the Set Leader. If the answer is yes, the unknown Set Leader procedure block 30 is entered as shown by the instruction in block 22. If the answer in block 21 is no, block 23 is entered and a reply is returned to the requesting TU with the sense code, since it may contain other elements of information for the TU's use, and the system returns to the start.

If a topology database update (TDU) indicator is returned to the Set Manager 4, and the update indicates that a Set Leader has failed or connectivity has been lost, block 41 is entered which invokes the unknown Set Leader procedure in block 30 of FIG. 6 which, when it is completed, returns at point B and enters block 42 where the join set for local set membership is performed and local set membership records will be maintained by the newly identified Set Leader and the system returns to the start.

In FIG. 6, the procedure for identifying and establishing a new Set Leader is set forth. The system begins in block 30 where Set Manager queries the topology database for the location and identity of the Registrar. Block 31 is where the response from the topology database is examined to determine if a Registrar exists. if a Registrar exists, block 32 is entered and a set leadership assertion request is sent to the known Registrar by the Set Manager. If a positive reply is not received in block 33, block 30 is reentered to learn the identity of the known Registrar, but if a positive reply is found in block 33, block 34 is entered and the reply is checked to determine if another Set Leader exists for the set. If the answer is yes, block 35 is entered where the Set Leader information is recorded by the Set Manager and the process returns to the Set Manager processing code at the point calling the unknown Set Leader procedure initially.

Figure 7:
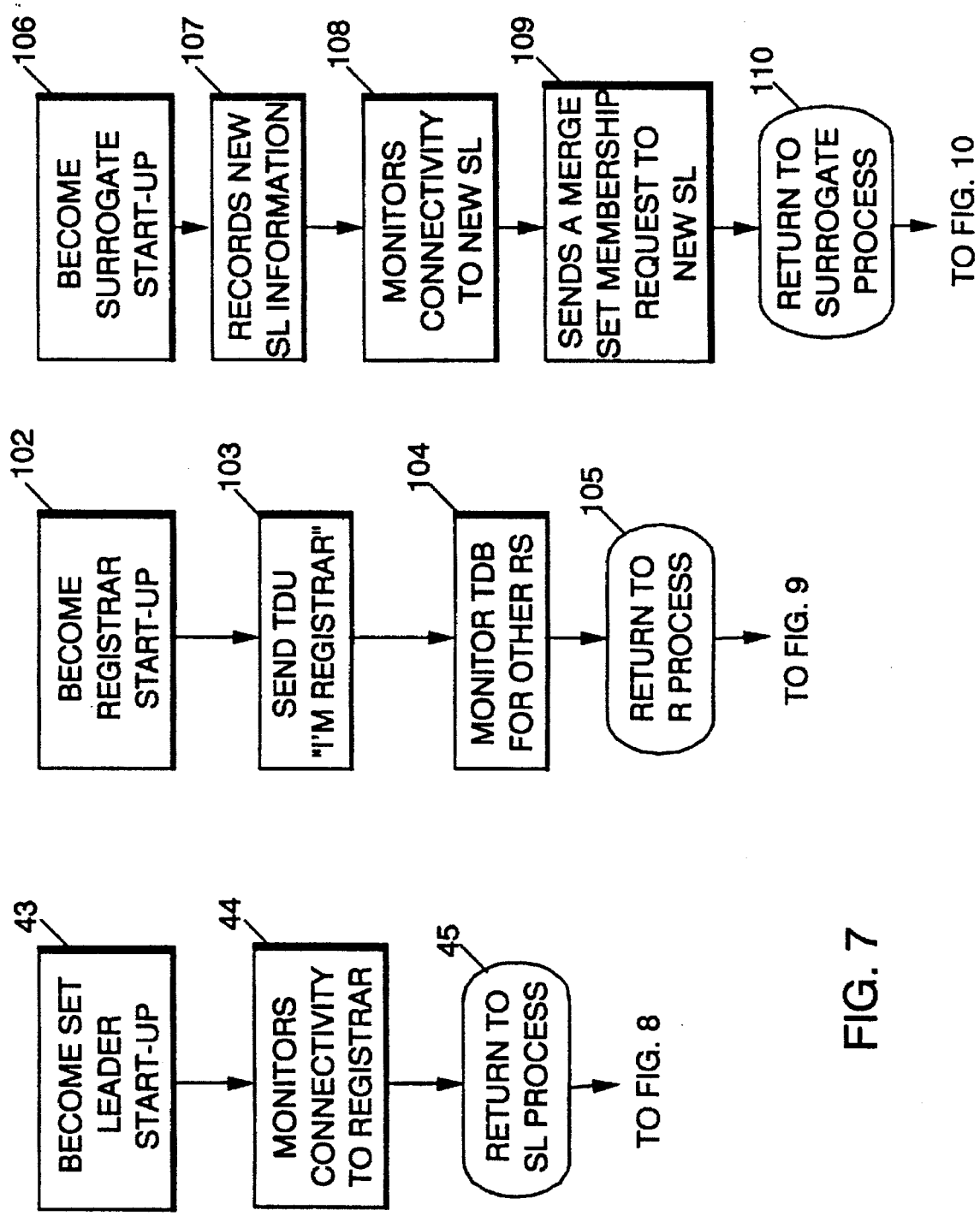
FIG. 7 illustrates the various Set Manager control modes that may be invoked at any Set Manager to become a Set Leader, a Registrar or a Surrogate in accordance with the preferred embodiment of the invention.

If another Set Leader does not exist for the set in block 34, then block 36 is entered where the Set Manager records the known Registrar's information and in block 37 the Set Manager becomes the Set Leader and initiates the become the Set Leader startup code of FIG. 7 and then returns to the Set Manager initiation in block 4 of FIG. 5.

If the check in block 31 of FIG. 6 shows that no Registrar exists, the Set Manager must become the Registrar and block 38 is entered which calls the Registrar startup initiation procedure of FIG. 9 that will be discussed later. Block 39 is then entered and the assert set leadership message is sent to the Registrar process code within the Set Manager station and in block 40 it becomes the Set Leader by calling the Set Leader startup code of FIG. 8 and then exits in block 43 to return to point B at block 42 of FIG. 5. At this point, the Set Manager has assumed the responsibility of being the Registrar for the network, the Set Leader for the set and the Set Manager for any local attached TUs which it services.

FIG. 7 shows the various Set Manager mode startup procedures for becoming Set Leader (block 43), network Registrar (block 102) or Surrogate Set Leader (block 106). In block 43 the process for the Set Manager to become a Set Leader is initiated. In block 44 it monitors connectivity to the known Registrar and in block 45 returns to the Set Leader process which is initiated in FIG. 8 (that will be discussed later) where it enters block 46.

If the Set Manager is to become the network Registrar, block 102 is entered for startup of this process. In block 103 the Set Manager sends to the network a topology database update message indicating that this Set Manager is becoming the Registrar for the network as shown in block 103. The Registrar then monitors the topology database to determine if any other Set Managers have registered as Registrar in block 104. In block 105, having initiated the Registrar startup procedure, the Set Manager enters FIG. 9 to be the Registrar.

In block 106, the Surrogate Set Leader startup procedure is invoked which records (block 107) the new Set Leader information received from the topology database or the Registrar upon joining of two previously separated subnetworks in which the new Set Leader has been identified. The Surrogate Set Leader then monitors (block 108) its connectivity to the new Set Leader and acts as Surrogate Set Leader by sending a merge set membership list to the new Set Leader in block 109. It then returns to the Surrogate process in FIG. 10 as shown by block 110.

Figure 8B:
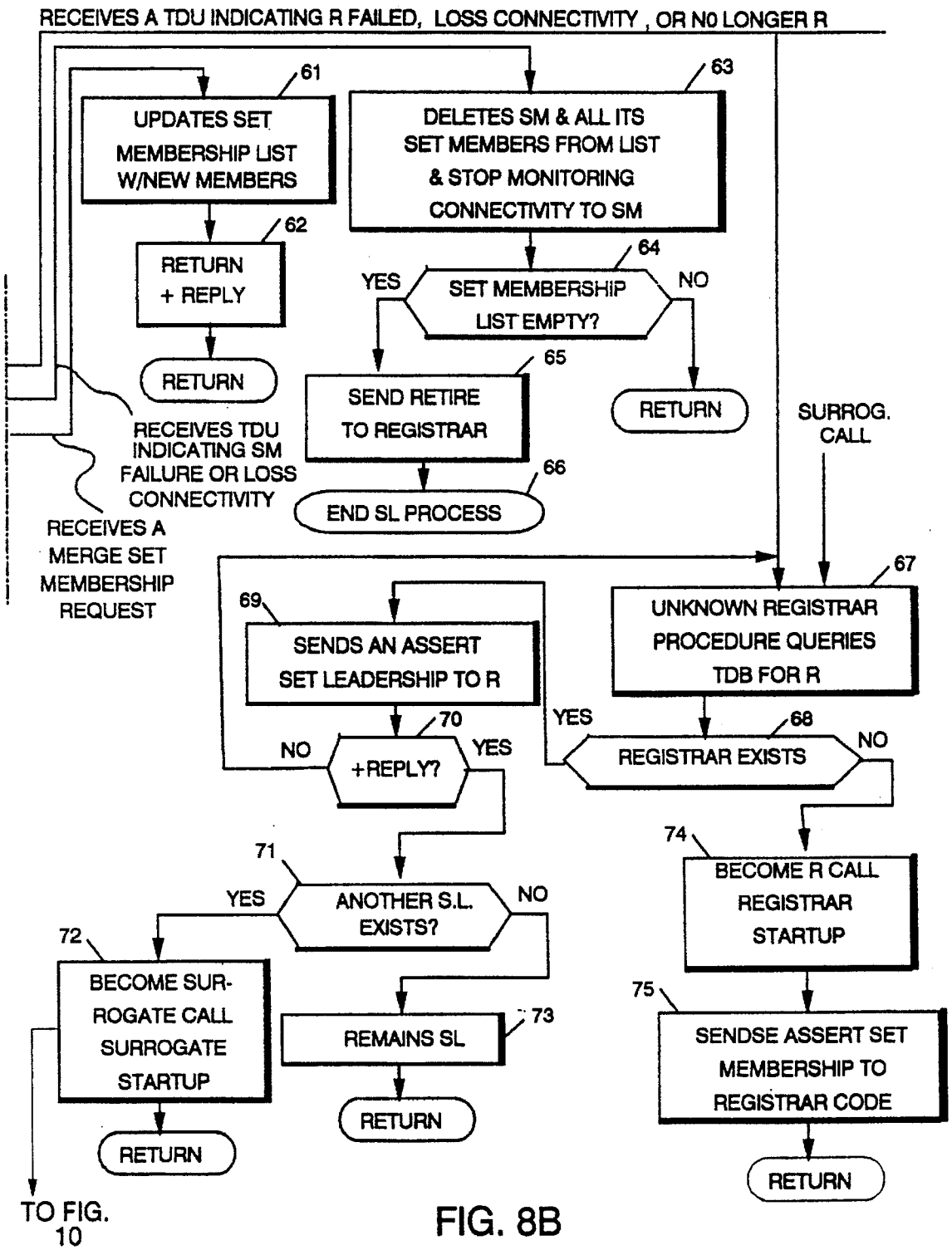

FIG. 8 illustrates the process for the Set Manager becoming a Set Leader and begins in block 46 with input from the topology database, the Set Manager or the Registrar. The input is examined and in block 46 it determines that a join set request has been received from a Set Manager. In block 47 a check is made as to whether the requesting TU is already a set member. If the answer is yes, block 51 returns a positive reply to the Set Manager indicating that the requestor is already a member and the process returns to block 46. If the requesting TU is not already a set member, block 48 is entered and the requesting TU is added to the set membership list by the Set Leader. If a new Set Manager is indicated in the information received from the Set Manger requesting enrollment of a TU as a set member, block 49 will indicate this and the Set Leader will then monitor for connectivity to the newly identified Set Manager. A positive reply will be returned in block 50 and the operation returns to block 46.

If a "leave set" request is received by the Set Leader from a Set Manager it is checked in block 52 to determine whether the affected TU is already a set member. If the answer is yes, block 53 is entered and the TU is deleted from the set membership list maintained by the Set Leader. In block 54 a positive reply is returned to the Set Manager to indicate that its request has been accepted and block 55 is entered. In block 55 a check is made by the Set Leader to determine if the last transmission unit identified with the requesting Set Manager has been deleted and if the answer is yes, block 56 is entered and the Set Manager is deleted from the list and monitoring of connectivity to that Set Manager is ended. A check is also made to determine, in block 57, if the set membership list is empty and if the answer is yes, block 58 is entered and the Set Leader sends a retire request to the network Registrar indicating that the Set Leader for the identified set wishes to resign and the Set Leader process is ended in block 59. If, however, the set membership list is not empty the system merely returns to the beginning block 46. If the requesting TU has not been found to be a set member in the check in block 52, a negative reply is returned to the set manager indicating, by a sense code, that the requesting TU is not a member of the set as shown in block 60. The system then returns to the start at block 46.

If the Set Leader receives a merge set membership request from another Set Leader, block 61 updates the set membership list with new members identified by the request for merging the lists. It returns a positive reply in block 62 and then the operation returns to the start at block 46.

If the Set Leader receives a topology database update indicating that a Set manager has failed or connectivity has been lost to a Set Manager associated with any of the set members for which this Set Manager is Set Leader, block 63 is entered where the Set Leader deletes the Set Manager and all of its set members from the lists that it maintains and it stops monitoring the connectivity to that Set Manager. Block 64 is then entered to determine if the set membership list for the affected set is empty. If the answer is yes, the Set Leader sends a retire request to the network Registrar as shown in block 65 and the Set Leader process ends in block 66. If the set membership list is not empty, then the Set Leader must continue to be a leader and merely returns to block 46 as shown at the output of block 64 where the no condition is found.

When the Set Leader receives a topology database update indicating that a Registrar has failed or that connectivity to the Registrar has been lost or there is no longer a known Registrar, block 67 is entered. In block 67 the unknown Registrar procedure is called and an inquiry of the topology database for the known Registrar is made. The response from the topology database is checked in block 68 to determine if the Registrar exists. If the answer is yes, block 69 is entered and a assert set leadership message sent to the known Registrar so that the Set Leader can determine if it will continue to be the Set Leader. If a positive reply is received in block 70, a check is made to determine if another Set Leader exists and if no other Set Leader exists as shown in block 71, block 73 is entered and the present Set Leader remains the Set Leader by returning to block 46. If, however, block 70 does not show that a positive reply has been received to the assertion of set leadership, block 67 is reentered to determine who the Registrar may be and to again inquire, etc. Eventually a positive reply will be received, either when a Registrar has been created or the present Set Leader Set Manager also becomes a Registrar as will shortly be described. If another Set Leader is identified in block 71, block 72 is entered and the Set Leader becomes a Surrogate Set Leader for its set and it calls the Surrogate Set Leader startup procedure of FIG. 10 and then returns to the start at 46.

If no Registrar is found to exist in block 68, block 74 is entered and the Set Leader becomes the Registrar by calling the Registrar startup procedure of FIG. 7 at block 102 of FIG. 7 and then block 75 is entered where message asserting set leadership and listing the set membership is sent to the Registrar code portion invoked at the Set Manager and return to block 46 occurs as shown.

Figure 9A:
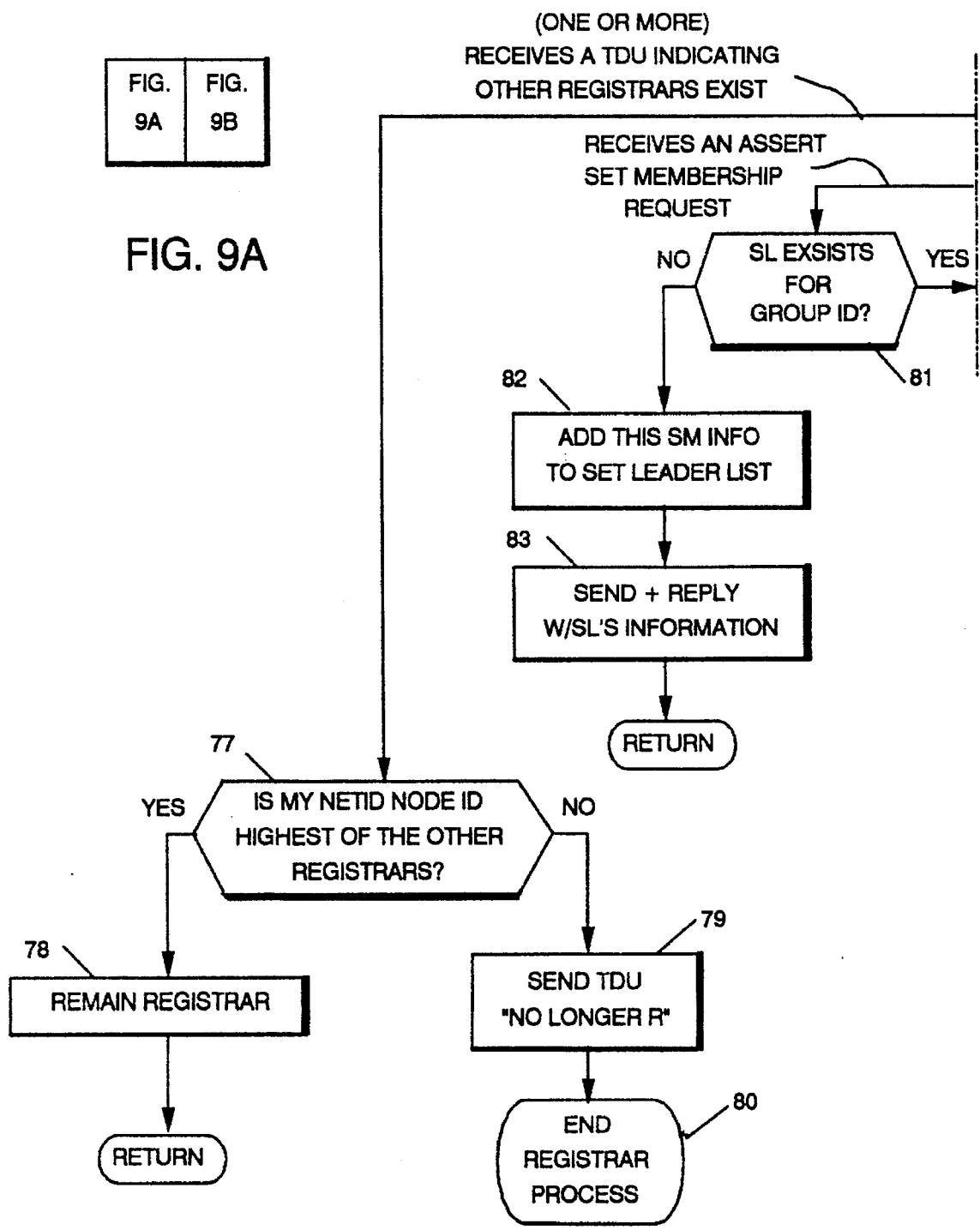
FIG. 9 illustrates the procedural flows invoked when a Set Manager becomes the Registrar for the network in accordance with the preferred embodiment of the invention.
Figure 9B:
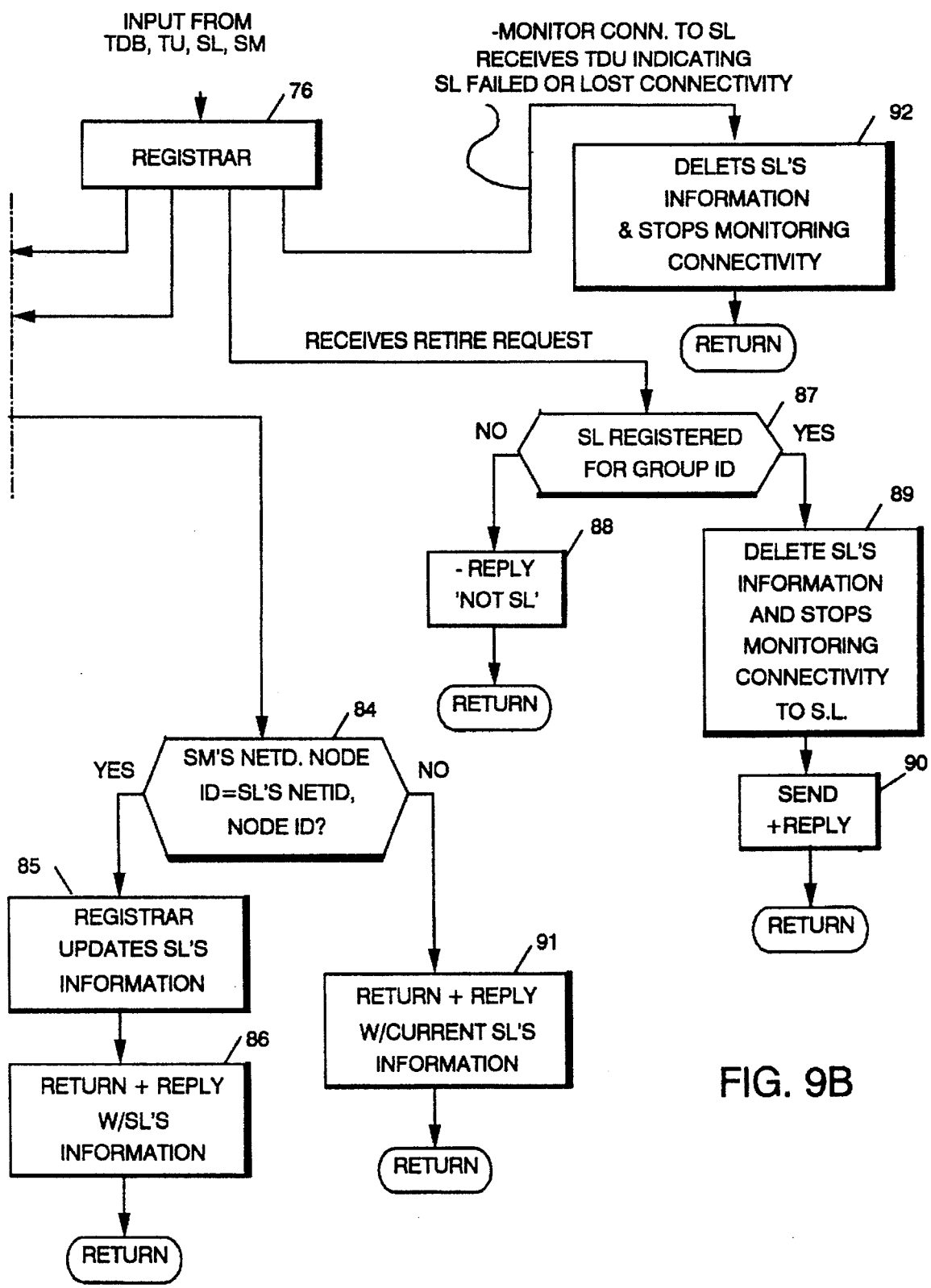

In FIG. 9, the operations of a Set Manager performing the duties of Registrar are shown beginning at block 76. Input to the Registrar can come from the topology database, a TU via Set Leader or Set Manager as shown. If the Registrar receives a topology database update indicating that one or more other Registrars exist in the network, an intolerable situation since only a single Registrar per network is permitted, block 77 is entered. In block 77 the Registrar checks whether its own identification is the highest priority one among all of the Registrars indicated to exist. Arbitrary means for determining the priority such as having the highest alphanumeric address, being the first Registrar listed or requesting the privilege of being Registrar, the longest acting Registrar or any other criteria may be used. In the preferred embodiment, it is simplest to use a comparison of the alphanumeric addresses and choose the address having the highest alphanumeric value to be the successful Registrar. Such a test is conducted in block 77 and if the answer is "yes", then the present Set Manager remains the Registrar as shown in block 78. If the test in block 77 shows that the present Registrar does not have priority, it sends a message to the topology database as an update indicating that it is no longer Registrar as shown in block 79 and it ends the Registrar process in block 80.

If the Registrar receives an assertion of set membership request from a Set Leader or from a Set Manager, it checks in block 81 to determine if a Set Leader exists for the identified group ID of the set present in the assertion of set membership request. If no Set Leader exists, block 82 is entered and the requesting Set Manager is listed as the Set Leader for the set and the information for the Set Manager is added to the Set Leader list. In block 83 a positive reply is sent indicating to the requesting Set Manager that it will become the Set Leader. The system then returns to the input at block 76. If a Set Leader already exists for the identified group as shown at the output of block 81, block 84 is entered to determine whether the Set Manager's net ID and node ID are the same as the Set Leader's, i.e. whether the requesting Set Manager is already the Set Leader for the given set. If the answer is yes, block 85 is entered and the Registrar updates the Set Leader information and returns a positive reply with the Set Leader's information in block 86. If the Set Manager's address is not the same as the Set Leader's for the identified set, block 91 is entered and a positive reply is returned together with the identification of who the current Set Leader actually is.

If the Registrar receives a request to retire from a Set leader a check is made in block 87 to determine if the requesting Set Leader is registered for the identified set or group identification. If the answer is no, a negative reply that the Set Leader requesting resignation is not a Set Leader is given in block 88. If the Set Leader is the registered one for the identified group, block 89 is entered and the Set Leader's information is deleted as requested and the Registrar stops monitoring for connectivity to this Set Leader. It sends a positive reply in block 90 and returns to the beginning block 76.

If the Registrar receives a topology database update indicating that a Set Leader has failed or that connectivity to a Set Leader has been lost, block 92 is entered where the Registrar deletes the Set Leader's information and stops monitoring for connectivity to that Set Leader.

Figure 10:
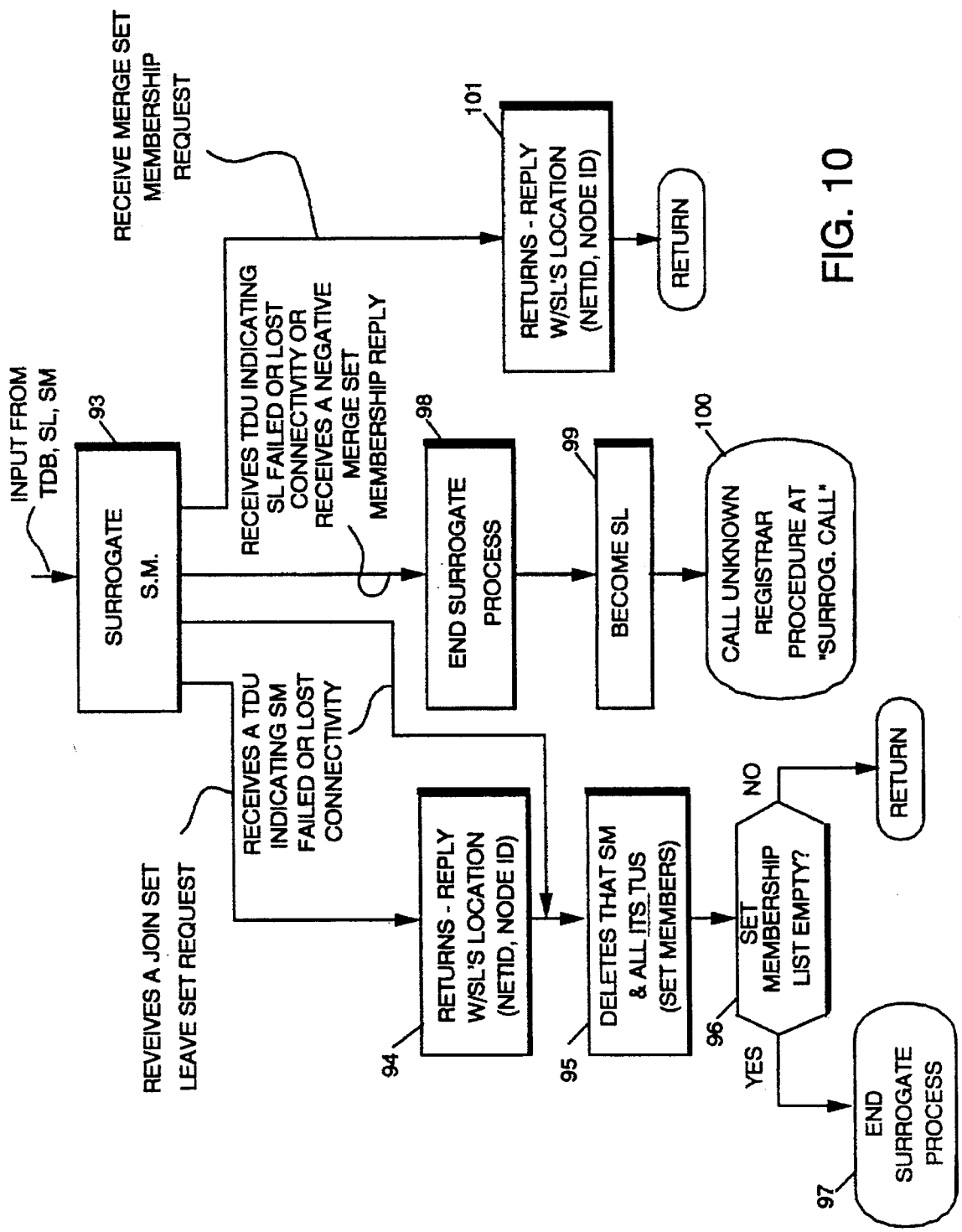
FIG. 10 illustrates the procedural flows and protocols in a preferred embodiment of the invention when a Set Manager becomes a Surrogate Set Leader.

In FIG. 10, the Surrogate Set Leader's process code flow is described as it responds to input from the topology database, the Set Leader or the Set Manager. The Surrogate Set Leader (block 93) may receive a request to join a set or to leave a set from a TU serviced by a Set Manager. If such a request is received, block 94 is entered and the Surrogate Set Leader returns a negative reply with the actual new Set Leader's identification. It then deletes the requesting Set Manager and all of its listed TUs as set members as shown in block 95 and since Set Manager now knows who the actual Set Leader is and since the new Set Leader has that information and has assumed this responsibility. The check is made in block 96 to determine if the set membership list is empty at the Surrogate Set Leader and if it is, then the Surrogate process is ended in block 97, but if not, the process returns to block 93.

If the Surrogate Set Leader receives a topology update message indicating that a Set Manager has failed or lost connectivity, it enters block 95 directly and the process flows as already described.

If the Surrogate Set Leader receives a topology database update indicating that a Set Leader has failed or lost connectivity or if it receives a negative reply to a merge set membership command it ends the Surrogate process in block 98, becomes the Set Leader in block 99 and calls the unknown Registrar procedure as shown in block 100. The unknown Registrar procedure begins at block 67 in FIG. 8 and operates as already described. If the Surrogate Set Leader receives a merge set membership request, returns a negative reply as shown in block 101 with the Set Leader's actual location and address information and then returns to block 93.

As can be seen from the foregoing operations, the set management process provides an ability to form a set of users and provides efficient communications to the set of users via a multicast routine which allows any one entity to communicate with multiple users. Packet delivery to a set of TUs without having to broadcast to all TUs in the network or by having to separately transmit copies of packets to each TU in a set is made possible by having the individual nodes with the managed set of responsibilities described above. The Set Manager is the key element in this system and it resides in each of the nodes as already described. It provides locally serviced TUs with multicast service and with distribution service if messages are received for locally serviced TUs. The Set Manager protocols or processes are distributed among the nodes as shown and allow the formation of a set of users and provide an efficient mechanism for communications among the members of the set or to the set from outside of the set.

The Registrar function is the centralized information base for open sets and its identity is globally known throughout the network. In an open set, TUs may independently join or leave the set. The set is created when the first TU joins or establishes the set and is destroyed when the last set member leaves.

One Set Manager is designated as a Set Leader for the set and maintains a listing of all of the set members; it is registered with the Registrar. The Set Leadership, the set membership and the Registrar's identity are all dynamic and may be changed at any time or as the situations within the network dictate. Sets are identified by group or set identification established by the TU or Set Manager creating a set. An open set will survive a partition of the network due to failure of some interconnecting link by the recovery mechanisms described above in which subset Registrar and Set Leaders are created automatically by the processes that have been outlined. For closed sets, membership is defined by the initiating TU and no other TUs may join or communicate with the members of the set. A closed set is not known globally in the network and the Set Leader is not registered with the Registrar. The initiating TU causes creation and destruction of a closed set at will and it defines the set membership that will be permitted. The initiating TU's Set Manager is the Set Leader for the closed set and maintains the set membership list. Closed sets will not survive network partitions since the information as to the membership of a set is not shared.

As shown in FIG. 2B, set management protocols have been established as shown in detail in FIGS. 5–10 for all of the functions and operations that are desired. For example, when a TU, such as shown in FIG. 2B, desires to join an open set, it provides its Set Manager (SM) with the group ID which identifies the set that the TU wishes to join. The SM determines the location of the Set Leader under several different cases. If the Set Manager has the Set Leader's location already cached and known to it, it merely sends a join message to the known Set Leader. However, if the Set Manager does not know the current Set Leader or its location, the SM checks the topology database for the location and identity of the Registrar for the network. If the Registrar is found to exist, the Set Manager sends as assert set leadership message to the Registrar which says if there is no Set Leader for this group, then designate the requesting Set Manager as the Set Leader but otherwise return the proper Set Leader's information to the Set Manager. If a Set Leader exists the Set Manager will send a join message to the identified Set Leader; if not, it will become the Set Leader and add the requesting TU to its set membership list. If the Set Manager does not know the Set Leader's location and/or there is no Registrar, then the Set Manager will become the Registrar and the Set Leader and will send a topology update message indicating that it has become Registrar. The flows of these messages under the various conditions noted are shown in FIG. 2B in a schematic way. If a network partition occurs as shown in FIG. 3, then a recovery process is invoked and results in a network configuration shown in FIG. 4.

As shown in FIG. 3, there is one set which has three members, TUx, TUy and TUz and a Set Leader SLb group ID1 and a Registrar R1. If the link, for example the link between R1 and the Set Leader SLb group ID1 fails, partition A as shown in FIG. 3 loses its Set Leader but partition B loses its Registrar. There must be one Registrar per network or subnetwork if a network is divided by partition. There must also be one Set Leader per set. This situation is resolved as shown in FIG. 4. A new Registrar is created in subnetwork B and a new Set Leader is automatically created in subnetwork A according to the flows and processes invoked by the monitoring of connectivity as shown previously in FIGS. 5-10.

When the network partitions A and B regain connectivity, the topology for the partitions must be exchanged and since there can only be one Registrar per network, the Registrar having lower priority (in the case of the preferred embodiment the one having the lower alphanumeric address or name) sends a topology update message indicating that it will no longer be the Registrar. Detecting the loss of its Registrar, the Set Leader in the network partition B would have become a Surrogate in its partition of the network and be the Set Leader to all of the members in the old partition, namely TUy and TUz. The Surrogate function minimizes disruption caused when the network partitions regain connectivity. Instead of each Set Manager sending an assert set leadership message to the established Registrar to determine the Set Leader's location, and a join message to the new Set Leader, the old Set Leader sends only one message which contains its set membership to the new Set Leader. At this time, the new Set Leader SLa, group ID1 has the complete set membership list. Old set members TUy and TUz think that their Set Leader is in partition B as SLb group ID1. Whenever the Set Managers for TUy or TUz perform a join, a leave or a send information for one of their locally serviced TUs, the Surrogate Set Leader SLb informs the Set Manager that it is no longer the Set Leader (after rejoining of the subnetworks) and sends, instead, the new Set Leader's location.

This method of operation allows open multicast sets to survive network partitions automatically and spreads over time network control messages flowing to and from the network Registrar, the Set Leader and the set members when connectivity of the network partitions is regained. This avoids generating a tremendous network control traffic surge at the instant that connectivity is regained. The Registrar function allows TUs in the network to locate open multicast sets. The Registrar is dynamically selected and identified in the topology database. Set Leaders register themselves with the Registrar and transport users seeking information about open sets request information via their Set Managers from the Registrar.

Therefore, it appears that in the improved network of the present invention, management of the entire network can be implemented in a distributed manner with the plural nodes performing the specific functions but working together cooperatively to provide the overall function of network management in which each node has a Set Manager acting on behalf of its various supported transport users and/or serving as Set Leader or even Registrar depending upon the specific conditions prevalent at the time.

It will be seen, therefore, that what has been described as a new form of network communications management, a new form of communications network itself, and a new network management technique, all of which may be implemented in any of a variety of network nodes having the basic processing capability of a processor (or host) as described with relation to FIG. 1A and the necessary switching or routing node hardware and software. As shown with regard to FIGS. 1B and 1C, the interconnections among nodes may be in any graphically represented scheme such as indicated by FIGS. 1D or 3 and 4. It will therefore be apparent to those of skill in the art that numerous departures from the implementation details may be made without departing from the general spirit and scope of the new network, network management and network control as described with regard to the preferred embodiment of the current invention, wherefore the claims which are appended hereto are intended to be by way of description and not by way of limitation.

What is claimed is:

1. A communications network management system including a plurality of interconnected nodes, comprising:

communications control means for providing distributed administration of multicast communications network user sets utilizing a plurality of selectable controls including communication network user Set Manager control means, Set Leader control means and network Registrar control means;

management mode control means at each node of said network, communicating with each communications network user at said node and responsive to the dynamic communications requirements of said users for selecting the mode of operation of said communication control means to exercise said network user Set Manager control means, said Set Leader control means and said network Registrar control means so that said network has active at any time only one said network Registrar control means in said communications network, only one Set Manager control means per node in said network and only one said Set Leader control means per set of users, means, including said Set Manager control means, for routing multicasting messages in the node in which that Set Manager Control means resides, means, including said Set Leader control means, for modifying the membership in said set of users corresponding to said Set Leader means; and means, including said Registrar control means, for insuring that there is only one of said Set Leader control means for each said set of users.

2. In a data communications network including a plurality of nodes interconnected by means of communication links, each of nodes having one or more users locally connected thereto, a multicast control system for controlling the substantially-concurrent distribution of data to sets of users, each set comprising one or more users, said control system including:

at each node, a set manager for maintaining a record of the set or sets to which each locally-connected user belongs;

for each set of users in the network, one and only one set leader located at one node for maintaining a record of all current users in a set regardless of which node a user is locally connected to;

for the entire data communications network, one and only one registrar located at one node for maintaining a list of set leaders in the network;

means responsive to a user request that data be transferred to members of a particular set to cause said set leader to retrieve records identifying all users in the set; and means for initiating the transfer of data to each identified user in the set.

3. A multicast control system as set forth in claim 2 wherein each said set manager includes means for establishing a new set identity in response to a user's request to join a set for which there are not existing set members and means for deleting a set identity when the last user resigns from the set.

4. A multicast control system as set forth in claim 2 wherein said registrar further includes means for maintaining a list of all current user sets in the network and a list of all users belonging to each of said current user sets.

5. A multicast control system as set forth in any one of claims 2-4, wherein each said set manager includes means responsive to receipt of messages addressed to a particular set to query the set leader for the identity of all users that are current members of the particular set.

6. For use in a data communications network including a plurality of nodes interconnected by means of communication links, each of said nodes having one or more users locally connected thereto, a method of controlling the multicasting of data to sets of users, each set comprising one or more users, said method comprising the steps of in each node in the network, maintaining a set manager database having records associating each locally connected user with each set currently in existence in the network of which the user is a member;

in one node in the network, maintaining a set leader database for a particular currently-existing set, said database including records identifying all users in the network who are members of the set;

in only one node in the network, maintaining a registry of set leader databases;

in response to a request from a user that data be sent to the members of a set, accessing the set leader database for the given set to retrieve the addresses of all members of the set; and initiating the transfer of data to each identified member of the set.

* * * * *